(12) United States Patent
Furui et al.

(10) Patent No.: US 8,493,660 B2
(45) Date of Patent: Jul. 23, 2013

(54) OPTICAL LAYERED BODY COMPRISING A LIGHT-TRANSMITTING SUBSTRATE AND ANTIGLARE LAYER, POLARIZER AND IMAGE DISPLAY DEVICE

(75) Inventors: Gen Furui, Tokyo (JP); Yukimitsu Iwata, Tokyo (JP); Takashi Kodama, Tokyo (JP); Yoshihiro Nishimura, Tokyo (JP); Koichi Mikami, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 696 days.

(21) Appl. No.: 12/377,782

(22) PCT Filed: Aug. 16, 2007

(86) PCT No.: PCT/JP2007/065958
§ 371 (c)(1),
(2), (4) Date: May 1, 2009

(87) PCT Pub. No.: WO2008/020610
PCT Pub. Date: Feb. 12, 2008

(65) Prior Publication Data
US 2010/0195311 A1 Aug. 5, 2010

(30) Foreign Application Priority Data
Aug. 18, 2006 (JP) .................................. 2006-223524

(51) Int. Cl.
*G02B 1/10* (2006.01)
(52) U.S. Cl.
USPC ............................. 359/580; 359/599; 359/601

(58) Field of Classification Search
USPC .................................. 359/580, 601, 609, 613
See application file for complete search history.

(56) References Cited

U.S. PATENT DOCUMENTS

| 7,931,953 | B2 * | 4/2011 | Iwata et al. .................. 428/179 |
| 2006/0153979 | A1 * | 7/2006 | Asakura et al. .............. 427/164 |
| 2009/0263653 | A1 * | 10/2009 | Yamamoto et al. ........... 428/340 |

FOREIGN PATENT DOCUMENTS

| JP | 6016851 | 1/1994 |
| JP | 6018706 | 1/1994 |
| JP | 2004-025787 A | 1/2004 |
| JP | 2004-341070 | 12/2004 |
| JP | 2006-010724 A | 1/2006 |
| JP | 2006-011419 | 1/2006 |
| JP | 2006-058616 | 3/2006 |
| JP | 2006-103070 | 4/2006 |
| JP | 2006-154839 | 6/2006 |
| JP | 2006-184493 | 7/2006 |
| WO | WO 2006088206 A1 * | 8/2006 |

* cited by examiner

*Primary Examiner* — Arnel C Lavarias
(74) *Attorney, Agent, or Firm* — Novak Druce Connolly Bove + Quigg LLP

(57) ABSTRACT

An optical layered body including a light-transmitting substrate and an antiglare layer provided on the light-transmitting substrate. The antiglare layer has a surface roughness on the outermost surface. In the optical layered body, a mean spacing of tops of local peak of profile S is 0.045 mm or more and 0.10 mm or less determined by the procedure disclosed in the specification. The optical layered body can attain properties such as an antiglare property, scintillation prevention and black color reproducibility such as gloss blackness simultaneously.

20 Claims, 4 Drawing Sheets

$$Ra = \frac{1}{l} \int_0^l |f(x)| \, dx$$

$l$ = Cut off value   3 times or more (basis)

OPTICAL LAYERED BODY COMPRISING A LIGHT-TRANSMITTING SUBSTRATE AND ANTIGLARE LAYER, POLARIZER AND IMAGE DISPLAY DEVICE

CROSS-REFERENCE TO RELATED APPLICATIONS

This application is a National Stage of PCT/JP2007/065958 filed Aug. 16, 2007 which in turn claims priority from Japanese Application 2006-223524 filed Aug. 18, 2006, the entire contents of which are incorporated herein by reference.

TECHNICAL FIELD

The present invention relates to an optical layered body, a polarizer and an image display device.

BACKGROUND ART

In image display devices such as cathode ray tube (CRT) display devices, liquid crystal displays (LCD), plasma displays (PDP), and electroluminescence displays (ELD), generally, an antireflection optical layered body is provided on the outermost surfaces thereof. Such an optical layered body for antireflection inhibits the reflection of images or decreases a reflectance by virtue of scattering or interference of light.

As one of such antireflection optical layered bodies, an antiglare layered body, in which an antiglare layer having a surface roughness is formed on the surface of a transparent substrate, is known. Such an antiglare layered body can prevent the reduction in visibility due to reflection of external light or reflection of images by scattering external light through a surface roughness of the surface. As an antiglare layered body, a layered body in which a surface roughness is formed with particles (Patent Document 1), and a layered body in which a surface roughness is formed by performing an emboss molding treatment (Patent Documents 2 and 3) are known.

In recent years, with an increase of high definition panel resolution, performance required of the optical layered body has been increased. It is thought that an antiglare layered body used for such high definition panels requires a fine surface roughness. That is, by having the fine surface roughness, the aim is a response to high definition panels. The antiglare layered body having such a fine surface roughness can respond to requirements of high definition panel resolution, however it has pointed to have problems that the image display face looks white (whitening) or contrast is deteriorated.

Further, if such a an antiglare layered body is applied to the surface of an image display device such as a personal computer, there is a problem that "scintillation", that is, a state in which when transmitting light from a back side such as a backlight in a display passes though a rough surface of an antiglare layered body formed at the outermost surface of a panel, this light disturbs displayed pixels because the surface roughness of the antiglare layered body is apt to act as a fine lens.

As a method of solving "scintillation", a technique of increasing a density of peaks and valleys of the surface for the purpose of enhancing sharpness, a technique of imparting an internal scattering effect to the antiglare layered body by adding scattering particles having a difference in refractive indexes with a resin composing the antiglare layer and the like are known.

However, such a method of solving "scintillation" is a method causing surface whitening or white cloud due to an internal scattering effect by a high density of peaks and valleys of the surface. Particularly in the method of increasing a density of peaks and valleys of the surface, scattering due to external light reflection is increased and whitening increases. Therefore, the antiglare property is good, but this method would be a factor that deteriorates contrast. That is, in conventional antiglare layered bodies, it was difficult to satisfy all of "antiglare property", "improvement of contrast", and "scintillation prevention". Therefore, there may be cases where these antiglare layered bodies are inferior in black color reproducibility including gloss blackness (clear and gloss black color), contrast and the like in a screen display. That is, there may be cases where a difference in gradation of black color is hardly recognized and sensitivity is low in expression of black color tone, particularly in low tone, in a bright room. Specifically, there may be cases where in color recognition between black and gray, sometimes color blur occurs or color tone could not be recognized and recognized as black of the same tone. In the antiglare layered bodies having a good antiglare property=scattering performance of external light, these visibility was significantly deteriorated.

On the other hand, in the antireflection method of based on light interference, techniques of imparting a function by controlling a refractive index or a layer thickness of each layer, such as a method in which a refractive index of a hard coat layer having a clear and smooth outermost surface is increased and a low refractive index thin film is provided on the hard coat layer, are known. In this method, the above-mentioned contrast is good, and the reflection of external substances in a surface of a display screen can be prevented by lowering (e.g., reflection Y value 0.1 to 0.8%) the reflectance without limit. However, this method has difficulties of controlling a layer thickness of a coat and has many problems in terms of production, and most of materials are expensive. Further, if the reflectance is lowered through light interference, interference color is produced, and therefore there was a problem that this interference color discolors white or black color in a screen reddish or bluish even though the reflectance is low. Further, when the reflectance is not so low, prevention of the reflection was sometimes difficult. Furthermore, it has been emerged that even though the reflectance is extremely low, the reflection cannot be prevented depending on an environment in which television is watched. For example, in an interior with white wall, the white wall is reflected as white on the surface of a screen as long as the surface is flat.

Accordingly, currently, developments of an optical layered body which can prevent scintillation of an image surface effectively and achieve black color reproducibility, particularly gloss blackness are desired, and particularly, an optical layered body which can be used for not only liquid crystal displays (LCD) but also other applications such as cathode ray tube (CRT) display devices, plasma displays (PDP), fluorescent display tubes and field emission displays is desired.

Patent Document 1: Japanese Kokai Publication Hei-6-18706
Patent Document 2: Japanese Kokai Publication Hei-6-16851
Patent Document 3: Japanese Kokai Publication 2004-341070

DISCLOSURE OF THE INVENTION

Problems to be Solved by the Invention

In view of the above state of the art, it is an object of the present invention to provide an optical layered body which can attain properties such as an antiglare property, scintillation prevention and black color reproducibility such as gloss blackness simultaneously.

Means for Solving the Problems

The present invention relates to an optical layered body comprising a light-transmitting substrate and an antiglare layer provided on the light-transmitting substrate, wherein the antiglare layer has a surface roughness on the outermost surface, and wherein in the optical layered body, a mean spacing of tops of local peak of profile S is 0.045 mm or more and 0.10 mm or less determined by the following procedure: a roughness curve of the surface roughness is measured, a mean line of the roughness curve is drown, and a reference length is set in the direction of the mean line, total number (m) of tops of local peak of profile of the roughness curve existing above the mean line within the reference length is counted, Si representing a value of a length between a (m)th top of local peak of profile and a (m−1)th top of local peak of profile, and n representing number of Si are introduced into the following formula (I):

[Formula 1]
$$S' = \frac{1}{n}\sum_{i=1}^{n} S_i \quad (I)$$

to determine S', and a value of S' in the following same reference length is calculated and the calculation is repeated N times, and S' j representing a value of S' calculated in the above formula (I) and N representing number of S' j are introduced into the following formula (II):

[Formula 2]
$$S = \frac{1}{N}\sum_{j=1}^{N} S'_j \quad (II)$$

to determine a mean spacing of tops of local peal of profile S, and wherein when denoting a mean spacing of profile irregularities of the surface of the optical layered body by Sm, a mean inclination angle of profile irregularities by θa, and mean roughness of the surface roughness by Rz, Sm is 50 μm or more and less than 100 μm, θa is 0.1° or more and 1.0° or less, and Rz is more than 0.2 μm and 1.0 μm or less.

Preferably, the antiglare layer comprises a single layer of a rough surface layer.

Preferably, the antiglare layer comprises an under coat rough surface layer and a surface adjustment layer formed on the under coat rough surface layer.

Preferably, the antiglare layer further comprises a low refractive index layer, and wherein the low refractive index layer has a lower refractive index than that of the under coat rough surface layer or the surface adjustment layer.

Preferably, the optical layered body is an antireflection layered body.

The present invention also relates to a method for producing the optical layered body comprising the step of applying a composition for an antiglare layer onto a light-transmitting substrate to form an antiglare layer.

The present invention also relates to a polarizer comprising a polarizing element, wherein the optical layered body is provided on the surface of the polarizing element opposed to a face where an antiglare layer of the optical layered body is present.

The present invention also relates to an image display device, comprising a light-transmitting display and a light source apparatus to irradiate the light-transmitting display from the backside, wherein the image display device comprises the optical layered body or the polarizer at the surfaces of the light-transmitting display.

Hereinafter, the present invention will be described in detail.

The present invention pertains to an optical layered body which controls optical properties by adjusting a peak and valley shape of the surface within a range according to objectives, thereby attaining properties such as an antiglare property, scintillation prevention and black color reproducibility such as gloss blackness simultaneously.

The present invention achieves the above-mentioned objects by setting particularly S described in detail below at a value within a prescribed range and setting Sm, θa and Rz at values within a prescribed range.

Gloss blackness of an image display device is black color reproducibility in performing black color display in the image display device under a bright-room environment, and it can be evaluated by visual observation. When an reflection angle of light at the time when incident light to the optical layered body from the outside is reflected covers a wide range, the light is reflected in all directions (diffuse reflected) according to angles of peaks and valleys of the surface of the optical layered body and reaches observer's eyes, and therefore inherent black color is not reproduced (that is, only a part of diffused light reaches the observer's eyes). On the other hand, when incident light is reflected so as to be concentrated into the vicinity of a specular reflection angle (in the case of the antiglare layer having a gradual peak and valley shape), light from a light source is seldom diffuse reflected and becomes specular reflection light and light other than this specular reflection light does not reach the observer's eyes, and therefore inherent black as a raven (clear and pure black color) is reproduced. In the present description, this inherent black color is referred to as gloss blackness.

In order to achieve this gloss blackness, the gradual peak and valley shape becomes important for the reasons described above. However, the peak and valley shape not only just have to be gradual but also have to be provided with an antiglare property together.

Accordingly, the present inventors made investigations concerning a range within which both of the gloss blackness and the antiglare property can be achieved, and consequently have verified that an optical layered body having a surface roughness suitable for such an object has an S value in a certain range. This S value is independently determined without depending on Sm, θa and Rz. In the present invention, it is considered that a smooth and gradual surface roughness which is hard to be quantified can be expressed by this S value.

Control for attaining a shape, in which the surface of the antiglare layer has such a S value, is different between the case of the single antiglare layer and the case of forming the surface adjustment layer on the under coat rough surface layer to form an antiglare layer.

In the case of a conventional antiglare (AG) layer, in order to produce the antiglare layer with a single layer, the antiglare layer is prepared in such a way that fine particles to be used are present densely in a coat and a shape of fine particle itself is utilized directly to the peak and valley of the antiglare layer. That is, when the fine particles having an average particle diameter of 3 μm are used, a film thickness to be processed is set at 3 to 4 μm and an outer surface of the fine particle is in a state of being coated with a thin matrix film (resin binder) and therefore the shape of a fine particle becomes a peak portion of the antiglare layer as it is. In such a case, the peak and valley portion is not a smooth peak and valley, and small peaks and valleys, which become noise against gloss blackness emerge. In the present invention, it is important to eliminate this noise-like peaks and valleys, and a method of applying a thick layer is better so as to eliminate noise. In order to attain smooth peaks and valleys, it is preferred that the fine particles exist sparsely in the film compared with the conventional type and a layer thickness is adjusted in such a way that the fine particles are agglomerated somewhere in the film or exist in an upper portion of the film and whereby a surface roughness is barely made. That is, in the case where the fine particles of 3 μm is used, it becomes possible to realize such a state by forming an antiglare layer having a film thickness of 10 μm or more or by reducing considerably an amount of the fine particles added to a matrix. However, since if the layer thickness is too large, the antiglare property is lost and physical properties of the optical layered body are adversely affected, the layer thickness of the antiglare layer is preferably 5 μm or more and 25 μm or less. When the antiglare layer having a small layer thickness is produced, it is preferable to provide a surface roughness by a method of not using fine particles. If the fine particles are used, it is preferable to select a monodisperse organic resin fine particle which is spherical and has a substantially uniform particle diameter among various fine particles described later.

When the antiglare layer is a double layer composed of the under coat rough surface layer and the surface adjustment layer, an effect of the layer thickness of the surface adjustment layer is larger than an effect of the surface roughness of the under coat rough surface layer. In the present invention, as described below, the layer thickness of the surface adjustment layer is preferably 0.6 μm or more and 15 μm or less. Even though the under coat rough surface layer has any surface roughness, S can be controlled by providing the surface adjustment layer on the under coat rough surface layer. In this case, there may be cases where a preferable S cannot be attained unless the surface adjustment layer with a thickness of 0.6 μm or more is formed. Further, if the surface adjustment layer is formed in a thickness of 15 μm or more, the surface roughness is very smooth and gradual, but it exceeds a proper range of S and there is a fear that the antiglare property may be lost.

In the present invention, it is important to adjust S obtained by a method described in detail below within a specific numeral range. A method of determining a mean spacing S will be described by use of FIG. 1. FIG. 1 shows a roughness curve of the surface roughness of the optical layered body. The roughness curve of FIG. 1 is specifically a curve formed by cutting the surface roughness of the optical layered body in the vertical direction to the rough surface of the optical layered body, and cutting off the component of surface roughness longer than a given wavelength (wavelength that can realize a roughness curve of the surface roughness) from the appeared profile curve by means of phase compensation type film.

"Mean line" in FIG. 1 means a line replacing a curve made by cutting off the component of surface roughness shorter than a given wavelength (wavelength that can realize a roughness curve of the surface roughness) from the appeared profile curve by means of phase compensation type low-pass film, with a straight line.

In this roughness curve, a reference length (for example, 0.8 mm) is set in the direction of the mean line, and number (m) of peaks existing above the mean line within the reference length is counted, and a length (Si) between a top of (m)th peak portion and a top of (m−1)th peak portion (adjacent peak portions) is measured, and this Si value (length) and n representing number of Si are introduced into the above formula (I) and n pieces of length (Si) are summed and averaged to determine S'.

Further, the following same reference length is picked up, S' determined in the above formula (I) is calculated and this procedure is repeated a plurality of (N) times, and in every N times, S'$_j$ representing a value of S' determined in the above formula (I) and N representing number of S' are introduced into the above formula (II), and N times of average value S' are summed and averaged to determine a mean spacing S.

In the present invention, a length in a direction of the mean line in the case of measuring N times is taken as an evaluation length (L).

For example, when N is 5 times, an evaluation length (L) is defined as follows:

$$L = N(5) \times 0.8 \text{ mm} = 4.0 \text{ mm}.$$

In the optical layered body of the present invention, when the mean spacing S is measured at a reference length of 0.8 mm, it is 0.045 mm or more and 0.10 mm or less. By adjusting the mean spacing S within the above range, it is possible to realize a shape having good gloss blackness and the antiglare property.

In the optical layered body of the present invention, when denoting a mean spacing of profile irregularities of the surface of the optical layered body by Sm, a mean inclination angle of profile irregularities by θa, and mean roughness of the surface roughness by Rz, Sm is 50 μm or more and less than 100 μm,
θa is 0.1° or more and 1.0° or less, and
Rz is more than 0.2 μm and 1.0 μm or less.

Gloss blackness of an image display device is black color reproducibility in performing black color display in the image display device under a bright-room environment, and it can be evaluated by visual observation. When an reflection angle of light at the time when incident light to the optical layered body from the outside is reflected covers a wide range, the light is reflected in all directions (diffuse reflected) according to angles of peaks and valleys of the surface of the optical layered body and reaches observer's eyes, and therefore inherent black color is not reproduced (that is, only a part of diffused light reaches the observer's eyes). In conventional optical layered bodies, that gloss blackness is reduced by forming a surface roughness is due to such causes. The present inventors made various investigations noting such an action, and by controlling a shape in such a way that incident light is reflected so as to be concentrated into the vicinity of a specular reflection angle, light from a light source is seldom diffuse reflected and becomes almost specular reflection light. Therefore, light other than this specular reflection light does not reach the observer's eyes, and therefore inherent clear black color is reproduced. Here, a shape, from which incident light is reflected so as to be concentrated into the vicinity of a specular reflection angle, is a gradual surface roughness which is defined by Sm, θa and Rz within specific ranges in the present invention. This gradual surface roughness means a shape in which peaks are like hills with gentle slope and on the other hand, valleys are nearly flat rather than a valley configuration because the valleys are extremely gradual valleys compared with peaks.

On the other hand, in an image display device having the surface of such a surface roughness, light is not without reflection, and since scattering which can inhibit the reflection and the reflection of images on a smooth clear layer occurs, this image display device can also obtain adequate performance in an antiglare property.

The present invention has been completed by finding that in these displays, both of an antiglare property and black color reproducibility can be obtained by controlling a surface roughness of the surface of an antireflection optical layered body to keep reflected-scattered light in a range of certain scattering angles.

In order to achieve gloss blackness and an antiglare property simultaneously through the actions described above, when denoting a mean spacing of profile irregularities of the surface of the optical layered body by Sm, a mean inclination angle of profile irregularities by θa, and ten-point mean roughness of the surface roughness by Rz, Sm is set at 50 μm or more and 100 μm or less, θa is set at 0.1° or more and 1.0° or less, and Rz is set at more than 0.2 μm and 1.0 μm or less, and by using Sm, θa and Rz within these ranges, a small reflection angle described above can be attained.

The surface roughness satisfying the above parameters has a more gradual surface roughness than that in a conventional optical layered body, and therefore diffusion of the reflected light can be more reduced than a conventional antiglare layer. Further, it is estimated that since the antiglare layer has such a gradual surface roughness, diffuse reflection of light is suppressed compared with a smooth surface without an antiglare layer and controlled scattering of light occurs within the vicinity of a specular reflection angle.

A schematic diagram of a cross section of the surface of a conventional antiglare layer is shown in FIG. 3a and a schematic diagram of a cross section of the surface of an antiglare layer in the present invention is shown in FIG. 3b.

As shown in FIG. 3a, there are few flat portions on the surface of a conventional antiglare layer and peaks and valleys lie smoothly and continuously. In such a surface roughness, an antiglare property is very excellent, but light is diffused at every location and adequate gloss blackness cannot be attained because there is no flat portion on the surface and the surface is curved everywhere. The reason for this is that a mean inclination angle θa is large.

On the other hand, since the surface, satisfying the above conditions of Sm, θa and Rz, of the antiglare layer in the optical layered body of the present invention does not have peaks densely as shown in FIG. 3b and the flat portion exists on the surface, gloss blackness can be attained together with the antiglare property.

In addition, an optical microscope photograph (reflective shoot, magnification 200 times) of the surface of a conventional antiglare layer is shown in FIG. 4a and an optical microscope photograph of the surface of an antiglare layer in the present invention is shown in FIG. 4b.

That is, by satisfying all of parameters described above, the surface of the optical layered body of the present invention has gradual flat portions as a surface roughness of the surface which are not present in conventional antiglare layers, and the angle, which is made by a bottom (flat portion) of the valley portion existing forms with a tangent line of a peak of the peak portion existing, becomes very small. Therefore, an optical layered body which keeps both of gloss blackness and an antiglare property suitable can be obtained.

Sm, θa and Rz in the present description are values obtained by the following method.

The antiglare layer in the optical layered body according to the present invention has a surface roughness. Sm (μm) represents a mean spacing of profile irregularities of this antiglare layer, θa (° represents a mean inclination angle of profile irregularities, and (Rz) represents ten-point mean roughness of the surface roughness, and their definitions are according to JIS B 0601 1994 and are also described in an instruction manual (revised on Jul. 20, 1995) of a surface roughness measuring instrument (model: SE-3400, manufactured by Kosaka Laboratory Ltd.).

θa has a unit of angle, and when an inclination is expressed in the form of a ratio (Δa) of a height to a base,
θa can be determined by this equation, $$\Delta a = \tan \theta a = \text{(total of the distance of the bottom of local valley of profile and the top of local peak of profile in roughness curve (equivalent to the height of local peak of profile)/reference length)}.$$

The reference length is as described in measuring conditions.

When parameters (Sm, θa, Rz) representing the surface roughness of the optical layered body of the present invention are measured, parameters can be measured according to the following measuring conditions using, for example, a surface roughness measuring instrument (model: SE-3400, manufactured by Kosaka Laboratory Ltd.), and this measurement is preferable in the present invention.

Measuring conditions of a surface roughness measuring instrument according to JIS B 0601 1994.

1) Stylus of detection section of surface roughness:
Model: SE 2555N (2 micron standard) manufactured by Kosaka Laboratory Ltd.
(tip radius 2 μm, tip angle: 90°, material: diamond)

2) Measuring conditions of surface roughness measuring instrument:
Reference length (cut off value λc of roughness curve):
1, 0.25 or 2, 0.8 or 3, 1.25 or 4, 2.5 mm
Evaluation length (Reference length (cut off value kc)×5):
1, 1.25 or 2, 4.0 or 3, 6.25 or 4, 12.5 mm
Drive speed of stylus: 0.1 to 0.5 mm/s
(When the reference length is 1, 2, 3, or 4, the evaluation length correspondingly becomes 1, 2, 3, or 4)

Selection of the reference length and the evaluation length of Rz and Sm were determined for each of ranges of Rz and Sm by a method specified in JIS B 0601 1994. Classifications of standard values of the reference length and the evaluation length corresponding to a range of Rz in the case of determining Rz are shown in Table 1 and classifications of standard values of the reference length and the evaluation length corresponding to a range of Sm in the case of determining Sm are shown in Table 2. A value in a parenthesis is a reference value.

TABLE 1

| Range of Rz (μm) | | Reference | Evaluation |
|---|---|---|---|
| Exceeding | Max. | length (mm) | length (mm) |
| (0.025) | 0.10 | 0.08 | 0.4 |
| 0.10 | 0.50 | 0.25 | 1.25 |
| 0.50 | 10.0 | 0.8 | 4 |
| 10.0 | 50.0 | 2.5 | 12.5 |
| 50.0 | 200.0 | 8 | 40 |

TABLE 2

| Range of Sm (mm) | | Reference | Evaluation |
| --- | --- | --- | --- |
| Exceeding | Max. | length (mm) | length (mm) |
| 0.013 | 0.04 | 0.08 | 0.4 |
| 0.04 | 0.13 | 0.25 | 1.25 |
| 0.13 | 0.4 | 0.8 | 4 |
| 0.4 | 1.3 | 2.5 | 12.5 |
| 1.3 | 4.0 | 8 | 40 |

On the other hand, in the prior art, there is a method for representing a surface shape of the optical layered body by use of Ra (arithmetic mean roughness).

The above-mentioned Ra (arithmetic mean roughness) is according to JIS B 0601 (1994). That is, as shown in FIG. 5, Ra means the value obtained by that when sampling only the reference length from the roughness curve in the direction of mean line, taking X-axis in the direction of mean line and Y-axis in the direction of longitudinal magnification of this sampled part and the roughness curve is expressed by $y=f(x)$, $f(x)$ within a range of the reference length is summed and the summation is divided by the reference length.

That is, a function $y=f(x)$ corresponds to an area of the roughness curve and areas of the roughness curve existing within a range of the reference length are summed and the summation of area is divided by the reference length to yield Ra.

Therefore, the Ra does not represent an average of a longitudinal height of the surface roughness. Further, even if actual surface roughness of two are different as shown in FIG. 6, the Ra of both curves are the same. Therefore, even if the surface roughness is specified by this Ra and Sm or θa described above, in consideration of the indistinctness in the shape shown in FIG. 6, this cannot represent a preferable surface roughness in the present invention, and therefore Ra is not selected as a parameter in the present invention.

AS described above, the optical layered body of the present invention controls the optical characteristics by controlling the shape of its surface so as to have a shape having a specific value range. Here, the "surface of the optical layered body" means the outermost surface of the antiglare layer adjacent to air in any of the cases where the antiglare layer is a single layer, the antiglare layer is composed of the under coat rough surface layer and the surface adjustment layer, or the antiglare layer further has the low refractive index layer and/or arbitrary layer, and the surface roughness of the outermost surface is coincident with the optical characteristic values of the surface roughness of the optical layered body in the present invention.

In addition, these values can be appropriately adjusted within desired ranges by adjusting the type of the resin to be used for forming the antiglare layer, the particle diameter and addition amount of particles to be used for forming the surface roughness, and the composition and the film thickness of the surface adjustment layer.

A layer thickness H of the antiglare layer is preferably 5 μm or more and 25 μm or less in consideration of the dispersion of fine particles in an ink composition or an antiglare layer and the stability of production, and more preferably 6 μm or more and 20 μm or less. On the other hand, while in production, a relatively high level of layer thickness control is required, the layer thickness of the antiglare layer is preferably 1 μm or more and less than 5 and more preferably 1.5 μm or more and 3.5 μm or less.

The layer thickness H of the antiglare layer refers to a portion from the interface on the display surface side of a substrate to the outermost surface of antiglare surface roughness adjacent to air. While an antiglare layer between the interface of the substrate and the outermost surface may be a single layer of the rough surface layer, may be a double layer composed of the under coat rough surface layer and the surface adjustment layer, or may be a multiple layer formed by forming any other layers, the layer thickness H in this case is a total thickness of all layers. That is, the layer thickness H means a thickness from the interface on the display surface side of a substrate to the outermost surface of antiglare surface roughness adjacent to air.

The layer thickness can be measured by the following method. A cross section of the optical layered body is observed in a transmission mode with a confocal laser scanning microscope (Leica TCS-NT: manufactured by Ernst Leitz Optische Werke: a magnification of 300 to 1000 times) to determine the presence or absence of the interface according to the following evaluation criteria. Specifically, a wet objective lens was applied to the confocal laser scanning microscope and about 2 ml of oil with a refractive index of 1.518 was placed on the optical layered body to be observed in order to obtain clear images without halation. The oil is used to eliminate an air layer between the objective lens and the optical layered body.

Procedure of Measurement

1: An average layer thickness was measured through the observation of a laser scanning microscope.

2: Measuring conditions were described above.

3: A layer thickness of the highest peak from the substrate and a layer thickness of the lowest valley from the substrate in the peak and valley per one image screen are measured, and this measurement was repeated for 5 image screens to yield 10 measured values to calculate an average from 10 measured values.

This laser scanning microscope can perform a nondestructive cross section observation by virtue of the difference in refractive indexes of the layers. Therefore, if the difference in refractive indexes is not clear or is close to 0, the thickness of the antiglare layer or the surface adjustment layer can be determined by observing SEM and TEM cross section photographs which can be observed through use of the differences in composition of the layers.

In the present invention, the antiglare layer may be a single layer of the rough surface layer, but it may be a double layer. When the antiglare layer is a double layer, the antiglare layer is preferably composed of the under coat rough surface layer and the surface adjustment layer provided on the under coat rough surface layer. The under coat rough surface layer has a surface roughness at its outermost surface and can be obtained by the substantially same procedure as in the antiglare layer which is a single layer of the rough surface layer.

A formation method of the antiglare layer in the case where the antiglare layer is a single layer of the rough surface layer (hereinafter, referred to as a single antiglare layer) will be described below.

A formation method of the above single antiglare layer is not particularly limited, and examples of the formation method include a method for forming a single antiglare layer having a surface roughness by using a composition for an antiglare layer containing a resin and fine particles (method 1); a method for forming a single antiglare layer having a surface roughness by using a composition for an antiglare layer containing only a resin without adding fine particles (method 2); and a method for forming a single antiglare layer by using a treatment for providing a surface roughness (method 3). Each of these methods 1 to 3 will be specifically described.

(Method 1) Method for Forming a Single Antiglare Layer Having a Surface Roughness by Using a Composition for an Antiglare Layer Containing a Resin and Fine Particles With respect to the fine particle used in the above method 1, several kinds of fine particles which are different in type and size can be appropriately selected and used. Each of these fine particles may be a spheric (for example, true spheric) or an elliptic particle, and a true spheric particle is more preferable. An average particle diameter R (μm) of each of the fine particles is preferably 1.0 μm or more and 20 μm or less, and an upper limit of the particle diameter is more preferably 15.0 μm, and a lower limit is more preferably 1.3 μm. In addition, the average particle diameter (R), the average particle diameter (μm) of the fine particle can be measured by such as a Coulter counter method (electric resistance method). Further, it can also be measured by a laser diffraction method or through SEM observation. Further, the fine particle may be a agglomerated fine particle, and when the fine particle is a agglomerated fine particle, it is preferred that a secondary particle diameter is within the above range. When the fine particles are monodisperse particles (particles having single shape), the average particle diameter R (μm) represents an average particle diameter thereof, and when the fine particles are particles of a nonspherical type having a broad particle size distribution, a particle diameter of particles most existing in a particle size distribution measured is taken as an average particle diameter.

With respect to the respective fine particle, 80% or more (preferably 90% or more) of all fine particles preferably falls within an average particle diameter R±1.0 (preferably, 0.3) μm. Accordingly, the uniformity of the surface roughness of the antiglare layered body becomes good, and scintillation can be prevented effectively. Further, the respective fine particles can be appropriately selected from fine particles which are different in an average particle diameter R, a particle size distribution, a shape and a material, and for example, in the case of such fine particles of a small particle diameter that an average particle diameter R is about 3.5 μm or less, it is also possible to form a rough surface layer with efficiency using the fine particles which are not monodisperse fine particles but has abroad particle range, but has a particles size distribution in which an average particle diameter is 3.5 μm.

Further, when many kinds of fine particles are used as the fine particle to be used, a mixture of two or three kinds of fine particles may be used which are different in particle diameter or material. When the mixture of two or three kinds of fine particles is used like this, a mixture of two or three kinds of fine particles, which are made of the same material and are different only in particle diameter and particle size distribution, may be formed, or a mixture of two or three kinds of fine particles made of different materials may be formed and used.

When a mixture of two or more kinds of fine particles is used, the fine particles preferably has a distribution profile having two or more distribution-peaks in a distribution of the whole particles. That is, by using particles with a large particle diameter having a property of principally forming a surface roughness in combination with particles with a small particle diameter, the particles with a large particle diameter can be uniformly distributed on the whole and a desired surface roughness can be attained.

That is, it is preferred that particles, in which the average particle diameter is 1.0 μm or more and 20 μm or less (preferably, a lower limit is 3.5 μm and an upper limit is 15.0 μm) and 80% or more (by weight; preferably 90% or more) of all fine particles falls within an average particle diameter R±1.0 (preferably, 0.3) μm, are taken as first fine particles, and a fine particle composition formed by adding second fine particles and third fine particle, respectively having smaller particle sizes, to the first fine particles and mixing these fine particles is used. In addition, when a plurality of fine particles are used by use of the second fine particles, a difference n in refractive indexes between the resin and the fine particle in the present invention is a value determined by subtracting a refractive index of the resin from a refractive index of the fine particle having the highest refractive index among the fine particles.

In the present invention, when the particle diameter of the first fine particles is denoted by R1 (μm) and the particle diameter of the second fine particles is denoted by R2 (μm), it preferably satisfies the following expression (I):

$$0.25R1 \text{(preferably } 0.50) \leq R2 \leq 1.0R1 \text{(preferably } 0.75) \quad \text{(I)}.$$

Further, the fine particles may further contain a plurality of other fine particles. This relationship holds between the second fine particles and the third fine particles. If the particle diameter of the third fine particles is denoted by R3, it preferably satisfies the following expression (II):

$$0.25 \times R2 \text{(preferably } 0.50) \leq R3 \leq 1.0 \times R2 \text{(preferably } 0.75) \quad \text{(II)}.$$

When a mixture of two or more kinds of fine particles made of different materials is used, it is preferable that these two or more kinds of fine particles have different average particle diameters as described above, but two or more kinds of fine particles having the same average particle diameter are also preferably used. However, when the first, second and third fine particles are composed of the same component, it is preferable that the particle diameters differ inevitably.

When R2 is 0.25R1 or higher and R3 is 0.25R2 or higher, dispersion of the applying solution becomes easy and particles are not agglomerated. Further, in a drying step after application, a uniform surface roughness can be formed without being affected with wind at the time of floating.

Further, according to another aspect of the present invention, when the total weight per unit surface area of the first fine particles is denoted by $M_1$, the total weight per unit surface area of the second fine particles is denoted by $M_2$, and the total weight per unit surface area of the resin is denoted by M, total weight ratio per unit surface area of the resin, first fine particles and second fine particles preferably satisfies the following expressions (III) and (IV):

$$0.08 \leq (M_1 + M_2)/M \leq 0.36 \quad \text{(III) and}$$

$$0 \leq M_2 \leq 4.0 M_1 \quad \text{(IV)}.$$

The content of the second fine particles is preferably 5 to 100% by weight with respect to the content of the first fine particles. Further, when the third fine particles are used, the content thereof may be similar to that of the second fine particles.

In the present invention, it is preferable to form a surface roughness using two kinds of fine particles or three kinds of fine particles.

In this case, each kind of fine particle principally has the following role, and a material and a particle diameter of the fine particle can be appropriately selected based on the role. However, this role is just an example and the role of the first fine particles, the role of the second fine particles, and the role of the third fine particle can be appropriately selected.

First, when two kinds of the fine particles are used as a fine particle, the fine particles having a larger particle diameter (that is, the first fine particles described above) principally has a function of forming a surface roughness. As fine particles to be used for such an objective, fine particle (that is, fine particle in which the difference in refractive indexes between the fine particle and the binder resin is small) not having an internal diffusion property described later is principally selected. When the single antiglare layer is formed, a particle diameter of the first fine particles may be larger than a film thickness of a matrix resin. In this case, the first fine particles are in a state in which fine particles stuck their tops out of a coat of the antiglare layer and whereby, the surface roughness is formed.

In such the first fine particles, there may be cases where a preferable surface roughness cannot be obtained because of flocculation in the layer particularly when the first fine particles are made of a material which is easy to agglomerate. In such a case, it is preferable to use fine particles (that is, the second fine particles described above) having a smaller particle diameter of 75% or less of the particle diameter of the first fine particles in combination in order to improve the dispersibility of the first fine particles in a lateral direction in the antiglare layer. Accordingly, the surface roughness can be controlled well and formed uniformly throughout the coat. The above-mentioned second fine particles may be fine particles having an internal diffusion property or may be nonspherical coherent fine particles.

The third fine particles having a smaller particle diameter may be used in combination in addition to the first fine particles and the second fine particles. In this case, fine particles (that is, fine particle in which the difference in refractive indexes between the fine particle and the binder resin is large) generating an internal diffusion property are preferably selected as the third fine particles. The particle diameter of the second fine particles is preferably as small as 75% or less of the particle diameter of the first fine particles. The third fine particle is more fine than the second fine particles and becomes a space for making the dispersibility of the first fine particles and the second fine particles in a lateral direction in the antiglare layer better to form a preferable surface roughness. Accordingly, the surface roughness can be controlled well and formed uniformly throughout the coat. The particle diameter of the above-mentioned third fine particles is preferably as small as 75% or less of the particle diameter of the second fine particles.

A material of the fine particle is not particularly limited, and organic materials or inorganic materials can be used and transparent materials are preferable. Further, transparent organic materials are more preferable. Specific examples of fine particles formed from the organic materials include plastic beads. Examples of the above-mentioned plastic beads include styrene beads (refractive index 1.59 to 1.60), melamine beads (refractive index 1.57), acrylic beads (refractive index 1.49 to 1.53), acrylic-styrene beads (refractive index 1.54 to 1.58), benzoguanamine-formaldehyde beads, polycarbonate beads, polyethylene beads, and the like. The above-mentioned plastic beads preferably have a hydrophobic group at its surface and examples of the beads having a hydrophobic group include styrene beads. Examples of the above-mentioned inorganic fine particles include nonspherical silica, and the like.

As the above-mentioned nonspherical silica, silica beads having good dispersibility and a particle diameter of 0.5 to 5 μm are preferably used. The content of the nonspherical silica is preferably 1 to 30 parts by weight with respect to the binder resin. In order to improve the dispersibility of the nonspherical silica without causing an increase in the viscosity of the composition for an antiglare layer described later in detail, the average particle diameter and addition amount are changed and at the same time, presence or absence of organic material treatment for the particle surfaces may also be changed to be used. In the case of carrying out the organic material treatment for the particle surfaces, a hydrophobic treatment is preferable.

As for the above-mentioned organic material treatment, there are a method for chemically bonding a compound to the bead surface and a physical method for impregnating voids existing in a composition composing the bead with a compound without chemically bonding a compound to the bead surface, and either method may be used. Generally, a chemical treatment method, in which an active group of the silica surface such as a hydroxyl group or a silanol group is utilized, is preferably used from the viewpoint of treatment efficiency. As compounds to be used for the treatment, silane materials, siloxane materials, or silazane materials, which are highly reactive with the above-mentioned active group, are used. Examples of the compounds include straight alkyl monosubstituted silicone materials such as methyltrichlorosilane, branched alkyl monosubstituted silicone materials, or polysubstituted straight alkyl silicone compounds such as di-n-butyldichlorosilane, ethyldimethylchlorosilane and the like, and polysubstituted branched alkyl silicone compounds. Similarly, straight alkyl or branched alkyl monosubstituted or polysubstituted siloxane materials or silazane materials can also be effectively used.

A substance having a heteroatom, an unsaturated bonding group, a cyclic bonding group, or an aromatic functional group at the end or intermediate site of the alkyl chain may be used in accordance with a required function. In these compound, it becomes possible to convert the material surface to be treated readily from hydrophilicity to hydrophobicity since the alkyl group contained in the compound exhibits hydrophobicity, and therefore the compounds can attain high affinity for a polymeric material for which the compounds have low affinity in a state of being untreated.

In the above-mentioned fine particles, when two or more kinds of light-transmitting fine particles having different refractive indexes are used and these fine particle are mixed, an average value, according to a mixing ratio of each fine particle, of refractive indexes of the respective fine particles can be considered as a refractive index of the mixed light-transmitting fine particles, and therefore by adjusting a mixing ratio of the respective fine particles, detailed setting of the refractive index becomes possible, control of the refractive index becomes more easy than the case where one kind of fine particle is used, and various design becomes possible.

Therefore, in the present invention, two or more kinds of fine particles having different refractive indexes may be used as the above-mentioned fine particle. In this case, the difference in refractive indexes between the first fine particles and the second fine particle is preferably 0.03 or more and 0.10 or less. In the above-mentioned fine particle, the reason why the difference in refractive indexes between the first fine particles and the second fine particle is preferably 0.03 or more and 0.10 or less is that if the difference in refractive indexes is less than 0.03, since the difference in refractive indexes between both fine particles may be too small, a degree of freedom of refractive index control is small in mixing both fine particles, and if the difference in refractive indexes is more than 0.10, light diffusion may be determined by fine particles having a larger difference in refractive indexes between a matrix and the fine particle. In addition, the difference in refractive indexes is more preferably 0.04 or more and 0.09 or less, and particularly preferably 0.05 or more and 0.08 or less.

As the first fine particles which are included in the antiglare layer, particularly, fine particles having high transparency and a refractive index difference between the fine particle and a binder of the above-mentioned values are preferable. Specific examples of organic fine particles used for the first fine particle include an acrylic bead (refractive index 1.49 to 1.533), a styrene-acrylic copolymer bead (refractive index 1.55), a melamine bead (refractive index 1.57), a polycarbonate bead (refractive index 1.57), and the like. Examples of inorganic fine particles include a nonspherical silica bead (refractive index 1.45 to 1.50).

As the second fine particles, organic fine particles are preferable, and it is preferable to combine, particularly, organic fine particles having high transparency and a refractive index difference between the fine particle and a resin of the above-mentioned values to use.

Specific examples of organic fine particles used for the second fine particle include such as a styrene bead (refractive index 1.59 to 1.60), a polyvinyl chloride bead (refractive index 1.60), and a benzoguanamine-formaldehyde condensate bead (refractive index 1.66).

Further, when two kinds of fine particles having different refractive indexes are used as the above-mentioned fine particle, it is preferable to set a particle diameter of the fine particle so as to satisfy the relationship of particle diameter of the first fine particles>particle diameter of the second fine particles as described above, but by daring to equalize the particle diameter of the first fine particles with that of the second fine particles, a ratio of the first fine particles to the second fine particles can be freely selected and used, whereby design of light diffusion becomes easy. Organic fine particles in which a monodisperse particle is easily obtainable is preferable in this point for equalizing the article diameter of the first fine particles with that of the second fine particles. Reduction in variations in the particle diameter is preferable because variations in the antiglare property and the internal scattering characteristics decrease and optical performance design of the antiglare layer becomes easy. Examples of means for enhancing monodispersibility include air classification and wet filter classification by filtration filter.

The single antiglare layer can be formed by using a composition for an antiglare layer containing the above-mentioned fine particles and a curable resin. As the above-mentioned curable resin, a transparent resin is preferable, and examples of the curable resin include ionizing radiation-curable resins which are resins to be cured with ultraviolet light or electron beams, and a mixture of the ionizing radiation-curable resin and a solvent-drying resin (a resin, such as a thermoplastic resin, which forms a coat by only evaporating a solvent previously added in order to adjust a solid content in applying the resin), or a thermosetting resin. More preferably, the curable resin is the ionizing radiation-curable resin. In addition, in the present description, the term "resin" is a concept which also comprehends resin components such as a monomer and an oligomer.

Examples of the above ionizing radiation-curable resins include compounds having one or more unsaturated bonds such as compounds having acrylic functional groups and the like. Examples of the compounds having one unsaturated bond include ethyl (meth)acrylate, ethylhexyl (meth)acrylate, styrene, methylstyrene, N-vinylpyrrolidone, and the like. Examples of the compounds having two or more unsaturated bonds include polyfunctional compounds such as polymethylolpropane tri(meth)acrylate, hexanediol (meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate and neopentyl glycol di(meth)acrylate; and reaction products (for example, a poly(meth)acrylate ester of polyhydric alcohol) of the polyfunctional compound with (meth)acrylate, and the like. In addition, in the present description, "(meth)acrylate" refers to methacrylate and acrylate.

Besides the above-mentioned compound, a polyester resin, a polyether resin, an acrylic resin, an epoxy resin, a urethane resin, an alkyd resin, a spiroacetal resin, a polybutadiene resin, and a polythiol-polyene resin, which have an unsaturated double bond and a relatively low molecular weight, can also be used as the above ionizing radiation-curable resin.

When the ionizing radiation-curable resin is used as an ultraviolet-curable resin, it is preferable to use a photopolymerization initiator. Specific examples of the photopolymerization initiator include acetophenones, benzophenones, Michler's benzoyl benzoate, α-amyloxim ester, thioxanthones, propiophenones, benzyls, benzoins, and acylphosphine oxides. Further, it is preferable to mix a photosensitizer to use, and specific example of the photosensitizer include n-butylamine, triethylamine, poly-n-butylphosphine, and the like.

As the photopolymerization initiator, in the case of resins having a radically polymerizable unsaturated group, acetophenones, benzophenones, thioxanthones, benzoin, or benzoin methyl ether is preferably used singly, or used as a mixture thereof. Further, as the photopolymerization initiator, in the case of resins having a cationically polymerizable functional group, aromatic diazonium salt, aromatic sulfonium salt, aromatic iodonium salt, a metallocene compound, or benzoin sulfonate is preferably used singly, or used as a mixture thereof. The addition amount of the photopolymerization initiator is preferably 0.1 to 10 parts by weight with respect to 100 parts by weight of the ionizing radiation-curable composition.

The ionizing radiation-curable resin can also be used in combination with the solvent-drying resin. The solvent-drying resin, which can be used in combination with the ionizing radiation-curable resin, is not particularly limited, and a thermoplastic resin can be generally used as the solvent-drying resin. By using the ionizing radiation-curable resin in combination with the solvent-drying resin, coat defects of a coated surface can be effectively prevented and whereby a more excellent gloss blackness can be attained. The thermoplastic resin is not particularly limited, and examples of the thermoplastic resin include styrene resins, (meth)acrylic resins, vinyl acetate resins, vinyl ether resins, halogen-containing resins, alicyclic olefin resins, polycarbonate resins, polyester resins, polyamide resins, cellulose derivatives, and silicone resins, and rubbers or elastomers. Preferably, the thermoplastic resin is non-crystalline and soluble in organic solvents (particularly, common solvent in which a plurality of polymers or curable compounds can be dissolved). Particularly from the viewpoint of a film forming property, transparency and weather resistance, styrene resins, (meth)acrylic resins, alicyclic olefin resins, polyester resins, cellulose derivatives (cellulose esters, etc.) and the like are preferable.

When a material of the light-transmitting substrate is a cellulose resin such as triacetyl cellulose (TAC), as the thermoplastic resins, cellulose resins, for example, nitrocellulose, acetyl cellulose, cellulose acetate propionate, ethyl hydroxyethyl cellulose and the like, are preferable.

Examples of the thermosetting resin include a phenolic resin, a urea resin, a diallylphthalate resin, a melanin resin, a guanamine resin, an unsaturated polyester resin, a polyurethane resin, an epoxy resin, an aminoalkyd resin, a melamine-urea copolycondensation resin, a silicon resin, a polysiloxane resin and the like. When the thermosetting resin is used, it can also be used in combination with a curing agent such as a crosslinking agent or a polymerization initiator, a polymerization accelerator, a solvent, a viscosity adjustment agent or the like as required.

The single antiglare layer can be formed by applying a composition for a single antiglare layer obtained by mixing fine particles and a resin in a proper solvent onto the light-transmitting substrate. The solvent may be selected and used in accordance with types and solubility of the resin, and it may be a solvent in which at least solid matter (a plurality of polymers and curable resin precursors, polymerization initiators, and other additives) can be evenly dissolved. As such a solvent, for example, ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halogenated hydrocarbons (dichloromethane, dichloroethane, etc.), esters (methyl acetate, ethyl acetate, butyl acetate, etc.), water, alcohols (ethanol, isopropanol, butanol, cyclohexanol, etc.), cellosolves (methyl cellosolve, ethyl cellosolve, etc.), cellosolve acetates, sulfoxides (dimethyl sulfoxide, etc.), amides (dimethylformamide, dimethylacetamide, etc.), and propylene glycol monomethyl ether (PGME) can be exemplified, and mixed solvents thereof may be used.

As the composition for a single antiglare layer, a composition to which a fluorine or silicone leveling agent is added is preferable. The above composition for a single antiglare layer to which a leveling agent is added can impart a sliding property or an antifouling property to the surface of a coat at the time of application or drying and enables to impart an effect of scratching resistance. The leveling agent is preferably utilized for a case where the light-transmitting substrate is a film-like light transmitting substrate (e.g. triacetyl cellulose) required to have heat resistance.

Examples of a method for applying the composition for a single antiglare layer onto the light-transmitting substrate include application methods such as a roller coating method, a Mayer bar (metering coating rod) coating method and a gravure coating method. By drying or ultraviolet curing or electron beam curing as required after applying the composition for a single antiglare layer, the above resin in the single antiglare layer is cured to form the single antiglare layer, and at the same time, the fine particle is fixed to form a surface roughness at the surface of the single antiglare layer.

Examples of an ultraviolet light source at the time of carrying out the ultraviolet curing include light sources of an ultra high-pressure mercury lamp, a high-pressure mercury lamp, a low-pressure mercury lamp, a carbon arc lamp, a black light fluorescent lamp and a metal halide lamp. As a wavelength of the ultraviolet light, a wavelength band of 190 to 380 nm can be used. Examples of an electron beam source at the time of carrying out the electron beam-curing include various electron beam accelerators of a Cockcroft-Walton type, a van de Graaff type a resonance transformer type, an insulating core transformer type, or a linear type, a Dynamitron type and a high-frequency type.

(Method 2) Method for Forming a Single Antiglare Layer Having Surface Roughness by Using Composition for a Single Antiglare Layer Containing Only a Resin without Adding Fine Particles The above-mentioned method is a method for forming a rough surface layer by providing the composition for a single antiglare layer, which is obtained by combining at least two kinds of components selected from the group consisting of polymers and curable resin precursors, and mixing them with a proper solvent, on the light-transmitting substrate.

The surface roughness according to the method 2 can be formed, for example, by using the composition for a single antiglare layer (hereinafter, this composition is referred to as a "composition for a phase separation type antiglare layer") containing at least two kinds of components selected from the group consisting of polymers and curable resin precursors. In such a method, by using the composition for a phase separation type antiglare layer which is formed by mixing at least two kinds of components selected from the group consisting of polymers and curable resin precursors with a proper solvent, a coat having a phase separated structure can be formed through spinodal decomposition from a liquid phase.

The above-mentioned composition for a phase separation type antiglare layer can form a phase separation structure with relatively regular inter-phase intervals by causing phase separation by spinodal decomposition between at least two kinds of components selected from the group consisting of polymers and curable resin precursors during the step for evaporating or removing the solvent by drying or the like after application on the light-transmitting substrate.

The above-mentioned spinodal decomposition forms a co-continuous phase structure along with the proceeding of the phase separation generated by removing a solvent and when the phase separation further proceeds, the continuous phase becomes discontinuous due to self surface tension to have a droplet phase structure (e.g. a sea-island structure of spherical, true spherical, disk-like, or elliptical independent phases). Accordingly, based on the extent of the phase separation, an intermediate structure between the co-continuous phase structure and droplet phase structure (the phase structure during the process of transferring from the above-mentioned co-continuous phase structure to the droplet phase structure) can also be formed. In the above-mentioned method 2, owing to such spinodal decomposition, the sea-island structure (droplet phase structure or phase structure in which one phase is independent or isolated), the co-continuous phase structure (or network structure), or the intermediate structure in which the co-continuous phase structure and the droplet phase structure are mixed form the fine peaks and valleys on the surface of the single layer antiglare layer after drying out of the solvent.

Such spinodal decomposition accompanied with evaporation of the solvent is preferable in that since the average intervals among domains of the phase separation structure have regularity or periodicity, the surface roughness formed finally is provided with regularity or periodicity. The phase separation structure formed by the spinodal decomposition can be fixed by curing the curable functional groups or curable resin precursors in the polymer. The curable functional groups or curable resin precursors can be cured by heating, light irradiation or combinations of these methods in accordance with the type of the curable resin precursors. A heating temperature is not particularly limited as long as it is a condition of maintaining the phase separation structure formed by the above-mentioned spinodal decomposition and it is preferably, for example, 50 to 150° C. The curing by light irradiation can be carried out by the above-mentioned method such as ultraviolet curing. In the composition for phase separation type antiglare layer having a photo-curable property, a photopolymerization initiator is preferably contained. The components having a curable property may be polymers having curable functional groups or curable resin precursors.

At least two kinds of components selected from the group consisting of polymers and curable resin precursors are preferably used by selecting the combinations causing phase separation by the spinodal decomposition in a liquid phase. The combination for causing phase separation include, for example, (a) combinations for causing phase separation because a plurality of polymers are non-compatible with one another; (b) combinations for causing phase separation because polymers are non-compatible with curable resin precursors; and (c) combinations for causing phase separation because a plurality of curable resin precursors are non-compatible with one another. Among these combinations, (a) combinations of a plurality of polymers and (b) combinations of polymers and curable resin precursors are preferable and particularly (a) combinations of a plurality of polymers are preferable.

In the phase separation structure, from the viewpoint of formation of the surface roughness on the surface of the single antiglare layer and increase of surface hardness, the droplet phase structure having at least island-like domains is advantageous. In addition, in the case where a phase separation structure composed of the polymer and the curable resin precursor (or curable resin) has the sea-island structure, the polymer component may form the sea-phase; however the polymer component preferably forms the island-like domains from the viewpoint of the surface hardness. Owing to formation of the island-like domains, the surface roughness exhibiting desired optical properties is formed at the surface of the single antiglare layer after drying.

The average intervals of the domains of the above-mentioned phase separation structure practically have, in general, regularity or periodicity and correspond to the surface roughness Sm. The average interphase intervals of the domains may be, for example, 50 to 100 μm. The average intervals among domains of the phase separation structure can be adjusted by selecting the combinations of resins (particularly selection of resins based on the solubility parameter). By adjusting the average intervals among domains in such a manner, the intervals of the peaks and valleys at the surface of the film to be obtained finally becomes a desired value.

Examples of the polymer include cellulose derivatives (e.g. cellulose esters, cellulose carbamates, cellulose ethers), styrene resins, (meth)acrylic resins, organic acid vinyl ester resins, vinyl ether resins, halogen-containing resins, olefin resins (including alicyclic olefin resins), polyester resins, polyamide resins, polycarbonate resins, thermoplastic polyurethane resins, polysulfone resins (for example, polyethersulfone and polysulfone), polyphenylene ether resins (for example, polymer of 2,6-xylenol), silicone resins (for example, polydimethylsiloxane, polymethylphenylsiloxane), and rubbers or elastomers (for example, diene rubbers such as polybutadiene and polyisoprene, a styrene-butadiene copolymer, an acrylonitrile-butadiene copolymer, an acrylic rubber, a urethane rubber, a silicone rubber). These polymers may be used singly or in combination of two or more kinds. At least one polymer of a plurality of polymers may have a functional group involved in a curing reaction of the curable resin precursor, for example, a polymerizable group such as (meth)acryloyl group. A component of the polymer may be thermosetting or may be thermoplastic, but is more preferably a thermoplastic resin.

The polymer is preferably non-crystalline and soluble in organic solvents (particularly, a common solvent in which a plurality of polymers or curing compounds can be dissolved). Particularly, resins having a high molding property or film forming property, high transparency and high weather resistance, for example, styrene resins, (meth)acrylic resins, alicyclic olefin resins, polyester resins, and cellulose derivatives (cellulose esters, etc.) are preferable.

Specific examples of the cellulose esters among the cellulose derivatives include aliphatic organic acid esters, for example, cellulose acetates such as cellulose diacetate, and cellulose triacetate; $Cl_{1-6}$ organic acid esters such as cellulose propionate, cellulose butylate, cellulose acetate propionate and cellulose acetate butylate; aromatic organic acid esters, for example, $C_{7-12}$ aromatic carboxylic acid esters such as cellulose phthalate and cellulose benzoate; inorganic acid esters such as cellulose phosphate and cellulose nitrate; mixed acid esters such as cellulose acetate-nitrate mixed ester; cellulose carbamates such as cellulose phenylcarbamate; cellulose ethers such as cyanoethyl cellulose; hydroxy-$C_{2-4}$ alkyl cellulose such as hydroxyethyl cellulose, and hydroxypropyl cellulose; $C_{1-6}$ alkyl cellulose such as methyl cellulose and ethyl cellulose; carboxymethyl cellulose or salt thereof, benzyl cellulose and acetylalkyl cellulose.

Examples of the styrene resin include homopolymers or copolymers (for example, polystyrene, a styrene-α-methylstyrene copolymer, a styrene-vinyl toluene copolymer) of styrene monomers, and copolymers of a styrene monomer and other polymerizable monomers [for example, (meth)acrylic monomers, amaleic anhydride, maleimide monomers, dienes]. Examples of the styrene copolymers include a styrene-acrylonitrile copolymer (AS resin), copolymers of styrene and (meth)acrylic monomers [for example, a styrene-methyl methacrylate copolymer, a styrene-methyl methacrylate-(meth)acrylate copolymer, a styrene-methyl methacrylate-(meth)acrylic acid copolymer, etc.], and a styrene-maleic anhydride copolymer. Examples of preferable styrene resins include polystyrene, copolymers [for example, copolymers having styrene and methyl methacrylate as the main component such as styrene-methyl methacrylate copolymer] of styrene and (meth)acrylic monomers, an AS resin, and a styrene-butadiene copolymer.

As the (meth)acrylic resin, homopolymers or copolymers of (meth)acrylic monomers and copolymers of a (meth)acrylic monomer and a copolymerizable monomer can be used. As specific examples of the (meth)acrylic monomer, (meth)acrylic acid; $C_{1-10}$ alkyl (meth)acrylate such as methyl (meth)acrylate, ethyl (meth)acrylate, butyl (meth)acrylate, t-butyl (meth)acrylate, isobutyl (meth)acrylate, hexyl (meth)acrylate, octyl (meth)acrylate, 2-ethylhexyl (meth)acrylate and the like; aryl (meth)acrylates such as phenyl (meth)acrylate and the like; hydroxyalkyl (meth)acrylate such as hydroxyethyl (meth)acrylate, hydroxypropyl (meth)acrylate and the like; glycidyl (meth)acrylate; (N,N-dialkylamino) alkyl (meth)acrylate; (meth)acrylonitrile; and (meth)acrylate having an alicyclic hydrocarbon group such as tricyclodecane or the like can be exemplified. As specific examples of the copolymerizable monomer, the above styrene monomers, vinyl ester monomers, maleic anhydride, maleic acid, fumaric acid and the like can be exemplified, and these monomers can be used alone or in combination of two or more kinds.

Examples of the (meth)acrylic resins include poly(meth)acrylates such as poly(methyl methacrylate), methyl methacrylate-(meth)acrylic acid copolymers, methyl methacrylate-(meth)acrylate copolymers, methyl methacrylate-acrylate-(meth)acrylic acid copolymers, and (meth)acrylate-styrene copolymers (MS resins). Specific examples of preferable (meth)acrylic resins include poly($C_{1-6}$ alkyl (meth)acrylate) such as poly(methyl (meth)acrylate), particularly, methyl methacrylate resins having methyl methacrylate as the main component (the content of the main component is 50 to 100% by weight, preferably about 70 to 100% by weight).

Specific examples of the organic acid vinyl ester resins include homopolymers or copolymers (polyvinyl acetate, polyvinyl propionate, etc.) of vinyl ester monomers, and copolymers (ethylene-vinyl acetate copolymer, vinyl acetate-vinyl chloride copolymer, vinyl acetate-(meth)acrylate copolymer, etc.) of a vinyl ester monomer and copolymerizable monomers, or derivatives thereof. Specific examples of the derivatives of the vinyl ester resins include polyvinyl alcohol, an ethylene-vinyl alcohol copolymer, a polyvinyl acetal resin, and the like.

Specific examples of the vinyl ether resins include homopolymers or copolymers of vinyl $C_{1-10}$ alkyl ethers such as vinyl methyl ether, vinyl ethyl ether, vinyl propyl ether, vinyl t-butyl ether and the like; and copolymers (vinyl alkyl ether-maleic anhydride copolymers, etc.) of vinyl $C_{1-10}$ alkyl ether and copolymerizable monomers.

Specific examples of the halogen-containing resins include polyvinyl chloride, polyvinylidene fluoride, vinyl chloride-vinyl acetate copolymer, vinyl chloride-(meth)acrylate copolymer, vinylidene chloride-(meth)acrylate copolymer, and the like.

Examples of the olefin resins include homopolymers of olefins such as polyethylene, polypropylene and the like, and copolymers such as ethylene-vinyl acetate copolymer, ethylene-vinyl alcohol copolymer, ethylene-(meth)acrylic acid copolymer and ethylene-(meth)acrylate copolymer. As specific examples of the alicyclic olefin resins, homopolymers or copolymers (for example, polymers having an alicyclic hydrocarbon group such as tricyclodecane which is sterically rigid) of cyclic olefins (for example, norbornene, dicyclopentadiene), and copolymers (for example, ethylene-norbornene copolymer, propylene-norbornene copolymer) of the above cyclic olefins and copolymerizable monomers can be exemplified. As specific examples of the alicyclic olefin resins, trade name "ARTON", and trade name "ZEONEX" are available.

Examples of the above-mentioned polyester resins include aromatic polyesters using aromatic dicarboxylic acid such as terephthalic acid, homopolyesters such as poly($C_{2-4}$ alkylene terephthalate), for example, polyethylene terephthalate and polybutylene terephthalate, and poly($C_{2-4}$ alkylene naphthalate), copolyesters containing $C_{2-4}$ alkylene arylate units ($C_{2-4}$ alkylene terephthalate and/or $C_{2-4}$ alkylene naphthalate) as a main component (e.g. 50% by weight or more) and the like. Specific examples of copolyesters include copolyesters obtained by partially replacing $C_{2-4}$ alkylene glycols among constituent units of the poly($C_{2-4}$ alkylene arylate) with polyoxy $C_{2-4}$ alkylene glycol, $C_{6-10}$ alkylene glycol, alicyclic diol (cyclohexanedimethanol, hydrogenated bisphenol A, etc.), diols having aromatic rings (9,9-bis(4-(2-hdryxoethoxy)phenyl)fluorene having fluorenone side chains, bisphenol A, or bisphenol A-alkylene oxide adduct, etc.), and copolyesters obtained by partially replacing aromatic dicarboxylic acid with asymmetric aromatic dicarboxylic acid such as phthalic acid and isophthalic acid or aliphatic $C_{6-12}$ dicarboxylic acid such as adipic acid. Specific examples of the polyester resins include polyarylate resins, aliphatic polyesters using aliphatic dicarboxylic acids such as adipic acid, and also homopolymers or copolymers of lactones such as 8-caprolactone. Preferable polyester resins are, in general, amorphous like amorphous copolyesters (e.g. $C_{2-4}$ alkylene arylate copolyesters) and the like.

Examples of the polyamide resin include aliphatic polyamides such as nylon 46, nylon 6, nylon 66, nylon 610, nylon 612, nylon11, and nylon 12, and polyamides obtained from dicarboxylic acids (e.g. terephthalic acid, isophthalic acid, adipic acid, etc.) and diamines (e.g. hexamethylenediamine, meta-xylylenediamine), and the like. Specific examples of the polyamide resins may be homocopolymers or copolymers of lactams such as ∈-caprolactam, or may be not only homopolyamide but also copolyamides.

Examples of the polycarbonate resins include aromatic polycarbonates based on bisphenols (bisphenol A, etc.), and aliphatic polycarbonates such as diethylene glycol bis(allyl carbonate).

As the polymer, a polymer having a curable functional group can also be used. The curable functional group may exist in a polymer main chain or may exist in a side chain, but it more preferably exists in a side chain. Examples of the curable functional group include condensing groups or reactive groups (for example, a hydroxyl group, an acid anhydride group, a carboxyl group, an amino group or an imino group, an epoxy group, a glycidyl group, an isocyanate group), polymerizable groups (for example, $C_{2-6}$ alkenyl groups such as a vinyl group, a propenyl group, an isopropenyl group, a butenyl group and an allyl group, $C_{2-6}$ alkynyl groups such as an ethynyl group, a propynyl group and a butynyl group, and $C_{2-6}$ alkenyliden groups such as vinylidene), and groups (for example, (meth)acryloyl group) having these polymerizable groups. Of these functional groups, polymerizable groups are preferable.

Examples of a method for introducing the curable functional group in a side chain include a method for reacting a thermoplastic resin having a functional group such as a reactive group or a condensing group with a polymerizable compound having a group which is reactive with the above functional group.

As the thermoplastic resin having a functional group such as a reactive group or a condensing group, thermoplastic resins (for example, (meth)acrylic resins, polyester resins, polyamide resins) having a carboxyl group or a group of an acid anhydride thereof, thermoplastic resins (for example, (meth)acrylic resins, polyurethane resins, cellulose derivatives, and polyamide resins, which have a hydroxyl group, respectively) having a hydroxyl group, thermoplastic resins (for example, polyamide resins) having an amino group, and thermoplastic resins (for example, (meth)acrylic resins and polyester resins, having an epoxy group) having an epoxy group can be exemplified. Further, resins obtained by introducing the functional group into a thermoplastic resin such as styrene resins, olefinic resins or alicyclic olefinic resins by copolymerization or graft polymerization may be used.

When the polymerizable compound is reacted with the thermoplastic resin having a carboxyl group or a group of an acid anhydride thereof, a polymerizable compound having an epoxy group, a hydroxyl group, an amino group, an isocyanate group or the like can be used. When the polymerizable compound is reacted with the thermoplastic resin having a hydroxyl group, examples of the polymerizable compound include polymerizable compounds having a carboxyl group or a group of an acid anhydride thereof, or an isocyanate group. When the polymerizable compound is reacted with the thermoplastic resin having an amino group, examples of the polymerizable compound include polymerizable compounds having a carboxyl group or a group of an acid anhydride thereof, an epoxy group, or an isocyanate group. When the polymerizable compound is reacted with the thermoplastic resin having an epoxy group, examples of the polymerizable compound include polymerizable compounds having a carboxyl group or a group of an acid anhydride thereof, or an amino group.

Of the polymerizable compounds, as the polymerizable compound having an epoxy group, for example, epoxycyclo-$C_{5-8}$ alkenyl (meth)acrylate such as epoxycyclohexenyl (meth)acrylate, glycidyl (meth)acrylate, allyl glycidyl ether and the like can be exemplified. As the polymerizable compound having a hydroxyl group, for example, hydroxy-$C_{1-4}$ alkyl (meth)acrylate such as hydroxypropyl (meth)acrylate and $C_{2-6}$ alkylene glycol (meth)acrylate such as ethylene glycol mono(meth)acrylate can be exemplified. As the polymerizable compound having an amino group, for example, amino-$C_{1-4}$ alkyl (meth)acrylate such as aminoethyl (meth)acrylate, $C_{3-6}$ alkenyl amine such as allylamine, and aminostyrenes such as 4-aminostyrene, and diaminostyrenes can be exemplified. As the polymerizable compound having an isocyanate group, for example, (poly)urethane (meth)acrylate and vinyl isocyanate can be exemplified. As the polymerizable compound having a carboxyl group or a group of an acid anhydride thereof, for example, unsaturated carboxylic acid or an anhydride thereof such as (meth) acrylic acid or maleic anhydride can be exemplified.

Typical examples of the polymerizable compounds include a combination of a thermoplastic resin having a carboxyl group or a group of an acid anhydride thereof and an epoxy group-containing compound, especially a combination of a (meth)acrylic resin ((meth)acrylic acid-(meth)acrylate copolymer, etc.) and epoxy group-containing (meth)acrylate (epoxycycloalkenyl (meth)acrylate, glycidyl (meth)acrylate, etc.). Specifically, a polymer obtained by introducing a polymerizable unsaturated group in a part of a carboxyl group of a (meth) acrylic resin, for example, a (meth)acrylic polymer (CYCLOMER P, manufactured by Daicel Chemical Industries, Ltd.) obtained by introducing a photopolymerizable unsaturated group in a side chain by the reaction of an epoxy group of 3,4-epoxycyclohexenyl methyl acrylate with a part of a carboxyl group of a (meth)acrylic acid-(meth)acrylate copolymer, can be used.

The introduction amount of the functional groups (particularly polymerizable groups) relevant to a curing reaction into the thermoplastic resins is preferably 0.001 to 10 mol, more preferably 0.01 to 5 mol, and furthermore preferably about 0.02 to 3 mol with respect to 1 kg of the thermoplastic resins.

The above-mentioned curable resin precursors are compounds having functional groups reacted by heat, an active energy beam (ultraviolet light and electron beams), and the like, and compounds capable of forming resins (particularly, curable resins or crosslinkable resins) by curing or crosslinking by heat, an active energy beam and the like. Examples of the above-mentioned resin precursors include, for example, thermosetting compounds or resins [low molecular weight compounds (e.g. epoxy resins, unsaturated polyester resins, urethane resins, silicone resins) having an epoxy group, a polymerizable group, an isocyanato group, an alkoxysilyl group, a silanol groups and the like], photo-curable compounds capable of curing by active light beam (ultraviolet rays and the like) (e.g. ultraviolet-curable compounds such as photo-curable monomers and oligomers), and the photo-curable compounds may be EB (electron mean)-curable compounds and the like. In addition, the photo-curable compounds such as photo-curable monomers and oligomers and photo-curable resins that may have a low molecular weight may be referred to simply "photo-curable resins".

The above-mentioned photo-curable compounds may be, for example, monomers and oligomers (or resins, particularly low molecular weight resins), and examples of the monomers include monofunctional monomers [(meth)acrylic monomers such as (meth)acrylic acid esters, vinyl monomers such as vinylpyrrolidone, and crosslinkable cyclic hydrocarbon group-containing (meth)acrylates such as isobornyl (meth) acrylate, and adamantyl (meth)acrylate], and polyfunctional monomers having at least two polymerizable unsaturated bonds [alkylene glycol di(meth)acrylate such as ethylene glycol di(meth)acrylate, propylene glycol di(meth)acrylate, butanediol di(meth)acrylate, neopentyl glycol di(meth)acrylate, and hexanediol di(meth)acrylate; (poly)oxyalkylene glycol di(meth)acrylate such as diethylene glycol di(meth) acrylate, dipropylene glycol di(meth)acrylate, and polyoxytetramethylene glycol di(meth)acrylate; crosslinkable cyclic hydrocarbon group-containing di(meth)acrylate such as tricyclodecane dimethanol di(meth)acrylate, and adamantane di(meth)acrylate; and polyfunctional monomers having about 3 to 6 polymerizable unsaturated bonds such as trimethylolpropane tri(meth)acrylate, trimethylolethane tri(meth)acrylate, pentaerythritol tri(meth)acrylate, pentaerythritol tetra(meth)acrylate, and dipentaerythritol penta(meth) acrylate.

Examples of the oligomer or resins include (meth)acrylate of bisphenol A-alkylene oxide adducts, epoxy (meth)acrylate (bisphenol A epoxy (meth)acrylate, novolak epoxy (meth) acrylate, etc.), polyester (meth)acrylate (e.g. aliphatic polyester (meth)acrylate, aromatic polyester (meth)acrylate, etc.), polyurethane (meth)acrylate (e.g. polyester urethane (meth) acrylate and polyether urethane (meth)acrylate), and silicone (meth)acrylate. These photo-curable compounds may be used alone or in combination of two or more kinds.

The above-mentioned curable resin precursors are preferably photo-curable compounds which can be cured in a short time, and examples are ultraviolet-curable compounds (monomers, oligomers and resins whose molecular weights may be low), and EB-curable compounds. Particularly, practically advantageous resin precursors are ultraviolet-curable compounds. Further, in order to improve the resistance such as scratching resistance, the photo-curable resins are preferably compounds having 2 or more (preferably 2 to 6, and more preferably 2 to 4) polymerizable unsaturated bonds in a molecule. The molecular weight of the curable resin precursors is 5000 or lower, preferably 2000 or lower, and more preferably about 1000 or lower in consideration of compatibility with polymers.

The polymers and the curable resin precursors have a glass transition temperature of, for example, $-100°$ C. to $250°$ C., preferably $-50°$ C. to $230°$ C., and more preferably about 0 to $200°$ C. (e.g. about 50 to $180°$ C.). In addition, it is advantageous from the viewpoint of the surface hardness that the glass transition temperature is $50°$ C. or higher (e.g. about 70 to $200°$ C.) and preferably $100°$ C. or higher (e.g. about 100 to $170°$ C.). A weight average molecular weight of the polymers may be selected within a range of, for example, 1000000 or lower and preferably about 1000 to 500000.

The curable resin precursors may be used in combination with a curing agent based on the necessity. For example, in a thermosetting resin precursor, a curing agent of amines, polycarboxylic acids or the like may be used in combination. The content of the curing agent is 0.1 to 20 parts by weight, preferably 0.5 to 10 parts by weight, and more preferably about 1 to 8 parts by weight (particularly 1 to 5 parts by weight) with respect to 100 parts by weight of the curable resin precursor, and may be about 3 to 8 parts by weight. A photopolymerization initiator may be used in combination with the photo-curable resin precursors. As the photopolymerization initiator, the above-mentioned photopolymerization initiator may be used.

The curable resin precursors may be used in combination with a curing promoter. For example, a photo-curable resin may contain a photo-curing promoter, for example, tertiary amines (e.g. dialkylaminobenzoic acid esters), a phosphine photopolymerization promoter and the like.

In the above-mentioned method 2, at least two kinds of components are selected from the group consisting of the above-mentioned polymers and curable resin precursors and used. In the above-mentioned case of (a) combinations for causing phase separation because a plurality of polymers are non-compatible with one another, the above-mentioned polymers can be appropriately combined and used. For example, in the case where the first polymer is a styrene resin (polystyrene, styrene-acrylonitrile copolymers, and the like), as the second polymer, cellulose derivatives (e.g. cellulose esters such as cellulose acetate propionate), (meth)acrylic resins (such as poly(methyl methacrylate)), alicyclic olefin resins (such as polymers using norbornene as a monomer), polycarbonate resins, and polyester resins (such as the above-mentioned poly($C_{2-4}$ alkylene arylate copolyesters) can be used. Further, for example, in the case where the first polymer is a cellulose derivative (e.g. cellulose esters such as cellulose acetate propionate), as the second polymer, styrene resins (such as polystyrene, styrene-acrylonitrile copolymer), (meth)acrylic resins, alicyclic olefin resins (such as polymers using norbornene as a monomer), polycarbonate resins, and polyester resins (such as the above-mentioned poly($C_{2-4}$ alkylene arylate copolyesters)) can be used. In combinations of a plurality of resins, at least cellulose esters (e.g. cellulose $C_{2-4}$ alkyl carboxylic acid esters such as cellulose diacetate, cellulose triacetate, cellulose acetate propionate, and cellulose acetate butyrate) may be used.

The proportion (weight ratio) of the first polymer and the second polymer may be selected within a range of the first polymer/second polymer of 1/99 to 99/1, preferably 5/95 to 95/5, and more preferably 10/90 to 90/10, and it is generally 20/80 to 80/20 and particularly 30/70 to 70/30.

The phase separation structure produced by the spinodal decomposition is ultimately cured by active light beams (ultraviolet light and electron beams) and heat to form a cured resin. Therefore, scratching resistance can be provided for the single antiglare layer and durability can be improved.

From the viewpoint of the scratching resistance after curing, at least one polymer among a plurality of polymers, for example one polymer of mutually non-compatible two polymers, (in the case of combining a first polymer and a second polymer, particularly both polymers) is preferably a polymer having functional groups reactive with the curable resin precursor in the side chains.

Examples of the polymer for forming the phase separation structure may contain the above-mentioned thermoplastic resins and other polymers besides the above-mentioned non-compatible two polymers.

Furthermore, the above-mentioned curable resin precursors (particularly, monomers or oligomers having a plurality of curable functional groups) may also be used in combination with the above-mentioned combination of a plurality of the polymers. In this case, from the viewpoint of the scratching resistance after curing, one polymer (particularly, both polymers) among a plurality of the above-mentioned polymers may be thermoplastic resins having functional groups (functional groups relating to the curing of the above-mentioned curable resin precursors) relevant to the curing reaction. The thermoplastic resins and the curable resin precursors are preferably mutually non-compatible. In this case, at least one polymer may be non-compatible with the resin precursors and other polymers may be compatible with the above-mentioned resin precursors.

The proportion (weight ratio) of the polymer and the curable resin precursor is not particularly limited and it may be selected within a range of the polymer/curable resin precursor of about 5/95 to 95/5, and preferably about 5/95 to 60/40, more preferably about 10/90 to 50/50, and particularly 10/90 to 40/60 from the viewpoint of the surface hardness.

In the case of causing phase separation by composing the polymer using a plurality of mutually non-compatible polymers, the curable resin precursors are preferably used in combination with at least one polymer compatible at around a processing temperature among a plurality of mutually non-compatible polymers. That is, when a plurality of mutually non-compatible polymers are constituted with, for example, a first resin and a second resin, the curable resin precursors may be compatible with either one of the first polymer and the second polymer, and preferably compatible with both of the polymer components. When the precursors are compatible with both polymer components, a phase is separated into at least two phases; a mixture of the first polymer and the curable resin precursors as main components and a mixture of the second polymer and the curable resin precursors as main components.

When the compatibility of a plurality of the selected polymers is low, the polymers are effectively phase-separated during the drying step for evaporating the solvent to improve the function of the single antiglare layer. The phase separation of a plurality of the polymers can easily be determined by preparing a homogeneous solution using a good solvent for both components and observing visually whether remaining solid matter becomes opaque or not during the process of gradually evaporating the solvent.

Generally, the phase-separated two-phase components are different in the refractive index from each other. The difference of the refractive indexes of the above-mentioned phase-separated two-phase components is preferably, for example, 0.001 to 0.2 and more preferably 0.05 to 0.15.

In the composition for a phase separation type antiglare layer, the solvent may be selected in accordance with types and solubility of the above-mentioned polymers and curable resin precursors to be used and may be a solvent in which at least solid matter (a plurality of polymers and curable resin precursors, reaction initiators, and other additives) can be evenly dissolved and can be used in wet type spinodal decomposition. As such a solvent, for example, ketones (acetone, methyl ethyl ketone, methyl isobutyl ketone, cyclohexanone, etc.), ethers (dioxane, tetrahydrofuran, etc.), aliphatic hydrocarbons (hexane, etc.), alicyclic hydrocarbons (cyclohexane, etc.), aromatic hydrocarbons (toluene, xylene, etc.), halogenated hydrocarbons (dichloromethane, dichloroethane, etc.), esters (methyl acetate, ethyl acetate, butyl acetate, etc.), water, alcohols (ethanol, isopropanol, butanol, cyclohexanol, etc.), cellosolves (methyl cellosolve, ethyl cellosolve, etc.), cellosolve acetates, sulfoxides (dimethyl sulfoxide, etc.), and amides (dimethylformamide, dimethylacetamide, etc.) can be exemplified, and mixed solvents thereof may be used.

The concentration of the solutes (polymers and curable resin precursors, reaction initiators, and other additives) in the composition for a phase separation type antiglare layer may be selected within limits which causes phase separation and do not impair a casting property and coatability and it is, for example, 1 to 80% by weight, preferably 5 to 60% by weight, and more preferably about 15 to 40% by weight (particularly 20 to 40% by weight).

(Method 3) Method for Forming a Single Antiglare Layer by Using a Treatment for Providing Surface Roughness The method 3 is a method for forming a single antiglare layer having a surface roughness by forming a coating layer composed of a resin and performing a molding treatment for providing the surface roughness to the surface of the coating layer. Such a method can be suitably carried out by a molding treatment using a mold having peaks and valleys which has a shape reversed to the surface roughness which the single antiglare layer has. The mold having peaks and valleys includes such as an emboss plate and an emboss roller.

In the method 3, the formation of the surface roughness may be carried out by forming a layer with a mold having peaks and valleys after providing a composition for a single antiglare layer, or the formation of the surface roughness and the formation of the single antiglare layer may be carried out simultaneously by supplying the composition for a single antiglare layer to an interface between the light-transmitting substrate and the mold having peaks and valleys and interposing the composition for a single antiglare layer between the mold having peaks and valleys and the light-transmitting substrate. In the present invention, a flat emboss plate may also be employed in place of the emboss roller.

A surface of the mold having peaks and valleys formed on the emboss roller or the flat emboss plate can be formed by various publicly known methods such as a sand blast method or a bead shot method. The single antiglare layer formed by using an emboss plate (an emboss roller) prepared by a sand blast method is provided with a shape in which a large number of valleys are distributed in its cross-sectional profile. The single antiglare layer formed by using an emboss plate (an emboss roller) prepared by a bead shot method is provided with a shape in which a large number of peaks are distributed on upper side in its cross-sectional profile.

It is said that when the mean roughness of the surface roughness formed at the surface of the single antiglare layer is the same, a single antiglare layer having a shape in which a large number of peaks are distributed on the upper side has less reflection of lighting apparatuses or the like in an interior room in comparison with the single antiglare layer having a shape in which a large number of the valleys are distributed on the upper side. Therefore, according to a preferable aspect of the present invention, it is preferable to form the surface roughness of the rough surface layer by using a mold having peaks and valleys which is formed to have the same shape as the surface roughness of the single antiglare layer in accordance with the bead shot method.

As a mold material for forming the surface of the mold having peaks and valleys, plastics, metals, wood, and the like can be used and composites thereof may also be used. From the viewpoint of the strength and wear resistance because of repeat use, the mold material for forming the surface of the mold having peaks and valleys, metal chromium is preferable and in terms of economy or the like, an emboss plate (an emboss roller) made of iron and surface-plated with chromium is preferable.

Specific examples of the particles (beads), which are blown in forming the surface of the mold having the surface roughness by the sand blast method or the bead shot method, include metal particles and inorganic particles such as silica, alumina, and glass. The particle size (diameter) of these particles is preferably about 30 to 200 µm. At the time of blowing these particles to the mold material, a method of blowing these particles together with a high speed gas. At that time, a proper liquid, for example, water or the like may be used in combination. Further, in the present invention, in order to improve the durability for use, the mold having peaks and valleys provided with the surface roughness is preferably plated with chromium or the like before using in terms of curing a coat and prevention of corrosion.

The composition for the single antiglare layer in the method 3 may include a resin or may include a resin containing fine particles which is the same as in the method 1. The above resin and fine particle are not particularly limited, and examples thereof include resins and fine particles exemplified in the method 1.

The composition for the single antiglare layer described above may further contains other additives. Examples of the above additives include additives in a composition for a surface adjustment layer described later.

In the optical layered body of the present invention, as described above, the antiglare layer may be a single layer or may be a double layer. When the antiglare layer is a double layer, the antiglare layer is preferably obtained by forming the surface adjustment layer on the under coat rough surface layer. If the optical layered body of the present invention has the surface adjustment layer, the surface roughness at the surface of the optical layered body becomes smooth, and furthermore by having surface roughness parameters within the above range, it is possible to prepare an optical layered body having extremely high gloss blackness while providing an adequate antiglare property. Therefore, when the optical layered body of the present invention has the surface adjustment layer, the optical characteristics, such as S, Sm, θa and Rz, of a surface roughness appearing at the surface of the surface adjustment layer are within the same range as that of the optical characteristics of the surface of the optical layered body of the present invention. In addition, when the antiglare layer includes the under coat rough surface layer and the surface adjustment layer, the surface roughness of the surface adjustment layer, naturally, coincides with the optical characteristics of the surface roughness of the optical layered body in the present invention. The above description is understood from the following contents and Examples.

The above under coat rough surface layer has a surface roughness at the outermost surface. Examples of such an under coat rough surface layer include the same rough surface layer as that of the single antiglare layer described above. For example, the above under coat rough surface layer can be formed by the same method for forming a single antiglare layer as that described above using a composition for an under coat rough surface layer. The above composition for an under coat rough surface layer is not particularly limited and includes the same composition as the above composition for a single antiglare layer.

With respect to the surface adjustment layer, it becomes possible to form smooth peaks and valleys by filling fine peaks and valleys existing along the surface roughness in the scale of 1/10 or less of the peak and valley scale (the peak height and the interval between peaks of the peaks and the valleys) on the roughness forming the surface roughness of the under coat rough surface layer, or it becomes possible to adjust the peak interval and the peak height of the peaks and valleys and the frequency (the number) of the peaks. Further, the surface adjustment layer may also be formed for the purposes of imparting prevention of static charge, refractive index adjustment, increase in hardness, an antifouling property and the like.

The above surface adjustment layer includes a resin binder. The above-mentioned resin binder is not particularly limited, but a transparent resin binder is preferable, and examples of the resin binder include ionizing radiation-curable resins which are resins to be cured with ultraviolet light or electron beams, and a mixture of the ionizing radiation-curable resin and a solvent-drying resin, and resins obtained by curing a thermosetting resin. More preferably, the resin binder is the ionizing radiation-curable resin. The ionizing radiation-curable resins, the mixture of the ionizing radiation-curable resin and a solvent-drying resin and the thermosetting resin are not particularly limited, and the above resins exemplified as a resin which can be used for forming the single antiglare layer, can be used.

The surface adjustment layer may contain organic fine particles or inorganic fine particles for adjusting fluidity. The organic fine particles or inorganic fine particles usable for the fluidity adjustment agent are not particularly limited in the shape and for example, spherical, platy, fibrous, nonspherical, and hollow shapes are all acceptable. A particularly preferable fluidity adjustment agent is colloidal silica. Conventionally, if trying to fill and smooth fine peaks and valleys by forming a surface adjustment layer, the antiglare property has been significantly deteriorated due to excessive smoothing. However, if a coat is formed using a composition containing the colloidal silica, it is possible to achieve an antiglare property and black color reproducibility simultaneously. Actions bringing in such an effect are not clear. However, since the composition containing the colloidal silica has an excellent following property to the surface roughness by controlling its fluidity, it is estimated that in smoothing, the fine surface roughness existing at the under coat rough surface layer, which is thoroughly crashed in a conventional surface adjustment layer, can remain without being thoroughly crashed while being provided with moderate smoothness.

In the present invention, the "colloidal silica" means a colloid solution obtained by dispersing silica particles in colloidal state in water or an organic solvent. The particle size (diameter) of the colloidal silica is preferably as small as ultrafine particles with about 1 to 50 nm. In addition, the particle size of the colloidal silica in the present invention refers to an average particle diameter measured by a BET method (the average particle diameter is calculated by measuring the surface area by a BET method and carrying out conversion into the diameter assuming the particles to be truly spherical).

The above-mentioned colloidal silica is publicly known silica, and examples of commercially available silica include "Methanol Silica Sol", "MA-ST-M", "IPA-ST", "EG-ST", "EG-ST-ZL", "NPC-ST", "DMAC-ST", "MEK", "XBA-ST", and "MIBK-ST" (all are manufactured by Nissan Chemical Industries Co., Ltd.; all trade names), "OSCAL 1132", "OSCAL 1232", "OSCAL 1332", "OSCAL 1432", "OSCAL 1532", "OSCAL 1632", and "OSCAL 1132" (all are manufactured by Catalysts and Chemicals Industries Co., Ltd.; all trade names).

An amount of the above-mentioned organic fine particles or inorganic fine particles are preferably 5 to 300 in terms of fine particle weight with respect to 100 of the binder resin weight of the surface adjustment layer (fine particle weigh/binder resin weight=P/V ratio=(5 to 300)/100). If the amount of the fine particles is less than 5, the following property to the surface roughness becomes insufficient and therefore, it may become difficult to achieve black color reproducibility such as gloss blackness and an antiglare property simultaneously. If it exceeds 300, since defects are caused in terms of physical properties such as adhesion and scratching resistance and therefore, it is preferably in the above-mentioned range. The addition amount varies depending on the fine particles to be added, but the addition amount is preferably 5 to 80 in the case of colloidal silica. When it exceeds 80, the antiglare property is not fluctuated even if the particles are added furthermore and the addition becomes meaningless and if it exceeds this value, defects of the adhesion to a lower layer arise and therefore, it is preferable to keep in the range.

Further, the surface adjustment layer may have a function of imparting an antistatic property, refractive index adjustment, increase in hardness and an antifouling property in addition to adjustment of the surface roughness of the rough surface layer described above. In this case, the surface adjustment layer can be formed from the composition for a surface adjustment layer containing an antistatic agent, a refractive index-adjusting agent such as a high refractive index agent, a medium refractive index agent and a low refractive index agent, an antifouling agent and other additives as required.

By adding an antistatic agent to the composition for a surface adjustment layer, it is possible to prevent dust adhesion at the surface of the optical layered body of the present invention effectively.

The antistatic agent is not particularly limited, and examples of the antistatic agent include cationic compounds having such as quaternary ammonium salt, pyridinium salt, a primary, a secondary, and a tertiary amino group; anionic compounds having such as a sulfonate group, a sulfate group, a phosphate group and a phosphonate group; ampholytic compounds such as amino acid and aminosulfate; nonionic compounds such as amino alcohol, glycerin and polyethylene glycol; organic metal compounds such as alkoxide tin or titanium; and metal chelate compounds such as acetylacetonate salt of the organic metal compound. As the antistatic agent, compounds formed by polymerizing the compounds described above can also be used. Further, polymerizable compounds such as monomer or oligomer which has a tertiary amino group, a quaternary ammonium group or a metal chelate portion and is polymerizable with ionizing radiation, and organic metal compounds like a coupling agent having a functional group can also be used as an antistatic agent.

Examples of the antistatic agent also include conductive polymers. By using the conductive polymer, it becomes possible that excellent antistatic performance is exerted and simultaneously a total light transmittance of the optical layered body is enhanced and a haze value is reduced. Further, an anion of organic sulfonic acid, iron chloride or the like may also be added as a dopant (electron-donating agent) for the purpose of improving electric conductivity or antistatic performance.

Examples of the above-mentioned conductive polymers include aliphatic conjugated polyacetylene, polyacene and polyazulene, aromatic conjugated polyphenylene, heterocyclic conjugated polypyrrole, polythiophene and polyisothianaphthene, heteroatom-containing conjugated polyaniline and polythienylenevinylene, mixed type conjugated poly(phenylenevinylene), a double chain conjugated system which is a conjugated system having a plurality of conjugate chains in a molecule, derivatives of these conductive polymers, and a conductive complex which is a polymer prepared by grafting or block-copolymerizing these conjugated polymer chain to a saturated polymer.

Among others, it is preferable to use polythiophene, polyaniline and polypyrrole.

Furthermore, polythiophene is particularly preferable since it has high transparency and a high antistatic property and an excellent effect of addition of dopant. As the above polythiophene, oligothiophene can also be suitably used.

Further, the above-mentioned derivatives are not particularly limited, and examples of the derivatives include such as alkyl group substitutes of polyphenylacetylene and polydiacetylene.

The antistatic agent may be a conductive metal oxide fine particle. The conductive metal oxide fine particle is not particularly limited, and examples of the conductive metal oxide fine particle include ZnO (refractive index 1.90, hereinafter, values in a parenthesis all represent a refractive index), $Sb_2O_2$ (1.71), $SnO_2$ (1.997), $CeO_2$ (1.95), indium tin oxide (abbreviation; ITO, 1.95), $In_2O_3$ (2.00), $Al_2O_3$ (1.63), antimony-doped tin oxide (abbreviation; ATO, 2.0), and aluminum-doped zinc oxide (abbreviation; AZO, 2.0). A fine particle refers to a particle having an average particle diameter of 1 micron or smaller, that is sub micron, and it is preferably a particle having an average particle diameter of 0.1 nm to 0.1 μm in that a composition capable of forming a highly transparent film, in which haze is little found and a total light transmittance is good, in dispersing the ultrafine particles in the binder can be prepared. The average particle diameter of the conductive metal oxide fine particle can be measured by a dynamic light-scattering method.

The addition amount of the antistatic agent is preferably 5 to 250% by weight with respect to the amount of the binder resin (excluding a solvent), and more preferably, an upper limit of the addition amount is 100% by weight and a lower limit is 7% by weight. The addition amount within the above-mentioned range is preferable in that by adjusting the addition amount within the above range, transparency as an optical layered body is maintained and antistatic performance can be provided without adversely affecting properties such as gloss blackness and an antiglare property.

The composition for a surface adjustment layer may contain an antifouling agent. The above-mentioned antifouling agent is primarily intended to prevent the fouling on the outermost surface of the optical layered body and it further enables to impart scratching resistance to the optical layered body. As the antifouling agent, additives to exert water repellency, oil repellency or a fingerprint removing property are effective, and examples of such antifouling agents include fluorine compounds, silicon compounds, and mixed compounds thereof. Examples of the above-mentioned silicon compounds include silane coupling agents having a fluoroalkyl group such as (2-(perfluorooctyl)ethyl)triaminosilane or the like, and particularly, a silane coupling agent having an amino group is preferable.

The high refractive index agent and the medium refractive index agent may be added to the surface adjustment layer in order to improve an antireflection property further. The refractive indexes of the high refractive index agent and the medium refractive index agent may be set at 1.46 to 2.00, and the medium refractive index agent refers to an agent having a refractive index of 1.46 to 1.80, and the high refractive index agent refers to an agent having a refractive index of 1.65 to 2.00.

Examples of these refractive index agents include fine particles and specific examples (value in a parenthesis indicates a refractive index) of the fine particles include such as zinc oxide (1.90), titania (2.3 to 2.7), ceria (1.95), antimony-doped tin oxide (1.80), tin-doped indium oxide (1.95), zirconia (2.0), and yttria (1.87).

The composition for a surface adjustment layer may further contains a fluorine or silicone leveling agent. The composition for forming a surface adjustment layer containing the leveling agent is preferable in point of making a coated surface better and being able to impart an effect of scratching resistance.

The above method for forming the surface adjustment layer is not particularly limited and the surface adjustment layer can be formed by applying the composition for a surface adjustment layer, which is obtained by mixing, for example, the above colloidal silica, a binder resin (including resin components such as a monomer and an oligomer), a solvent, and an arbitrary component used as required, onto the under coat rough surface layer. Examples of the above solvent include alcohols such as isopropyl alcohol, methanol and ethanol; ketones such as methyl ethyl ketone, methyl isobutyl ketone and cyclohexanone; esters such as methyl acetate, ethyl acetate and butyl acetate; halogenated hydrocarbons; aromatic hydrocarbons such as toluene and xylene; propylene glycol monomethyl ether (PGME); and mixtures thereof, and preferable examples include ketones and esters.

Examples of a method for applying the composition for forming a surface adjustment layer can be applied by a publicly known application method such as a Mayer bar (metering coating rod) coating method, a roller coating method, and a gravure coating method. After applying the composition for forming the surface adjustment layer, dry and curing are performed as required. In the formation of the surface adjustment layer, it is preferable that an ultraviolet curable resin is used as the binder resin and curing is performed with ultraviolet light. When curing is performed with ultraviolet light, ultraviolet light in a wavelength band of 190 to 380 nm is preferably used. Hardening with ultraviolet light can be performed by a metal halide lamp, a high-pressure mercury lamp, a low-pressure mercury lamp, an ultra high-pressure mercury lamp, a carbon arc lamp, a black light fluorescent lamp or the like. Specific examples of an electron beam source include various electron beam accelerators such as a Cockcroft-Walton type, a van de Graaff type, a resonance transformer type, an insulating core transformer type, a linear type, a Dynamitron type and a high-frequency type.

A layer (in curing) thickness of the surface adjustment layer is preferably 0.6 μm or more and 15 μm or less (preferably 12 μm or less), and a lower limit of the layer thickness is more preferably 1.5 μm or more and furthermore preferably 3 μm or more. An upper limit is more preferably 8 μm or less and furthermore preferably 5 μm or less. In addition, the thickness of the surface adjustment layer is a value calculated by measuring the thickness A of the under coat rough surface layer by the method described above and measuring the thickness B of (the under coat rough surface layer+surface adjustment layer), formed by providing the surface adjustment layer, and subtracting the A value from the B value (when there is difference in refractive indexes between the under coat rough surface layer and the binder resin of the surface adjustment layer, the layer thickness can also be determined by measuring A after B value measurement of the completed product. When there is no difference in refractive indexes between the two, the layer thickness can be determined by a method based on SEM or TEM described above. If the layer thickness is less than 0.6 μm, the antiglare property is good, but the gloss blackness cannot be improved in some cases. If the layer thickness is more than 15 μm, the gloss blackness is remarkably excellent, but a problem that the antiglare property is not improved may arise.

The antiglare layer may further include such as an antistatic layer, a low refractive index layer and an antifouling layer as an arbitrary layer, and preferably include the low refractive index layer. The low refractive index layer preferably has a lower refractive index than that of the single antiglare layer or the surface adjustment layer. Each of the antistatic layer, the low refractive index layer and the antifouling layer may be formed by preparing a composition, which is formed by adding a resin and the like to the antistatic agent, the low refractive index agent and the antifouling agent described, and using this composition. Therefore, the antistatic agent, the low refractive index agent, the antifouling agent, and the resin may be similar.

The low refractive index layer may be formed on the single antiglare layer or the surface adjustment layer. The antiglare layer having the low refractive index layer on the single antiglare layer may be substantially similar to the antiglare layer obtained by forming the surface adjustment layer to which a low refractive index property is imparted on the under coat rough surface layer. Further, the antiglare layer may be a layer to which the low refractive index layer is provided in addition to the surface adjustment layer. The low refractive index layer contains a low refractive index agent as a refractive index adjusting agent.

The low refractive index agent has a lower refractive index than that of the antiglare layer. In accordance with a preferable aspect of the present invention, it is preferable to have a constitution in which the refractive index of the antiglare layer is 1.5 or more and the refractive index of the low refractive index agent is less than 1.5 and preferably 1.45 or less. As the low refractive index agent, the same material as in the low refractive index layer described later can be used.

The low refractive index layer is a layer which plays a role in reducing the reflectance when external light (for example, a fluorescent lamp, natural light, etc.) is reflected at the surface of the optical layered body. The low refractive index layer is composed of preferably any of 1) a resin containing silica or magnesium fluoride, 2) a fluororesin having a low refractive index resin, 3) a fluororesin containing silica or magnesium fluoride, and 4) a thin film of silica or magnesium fluoride. With respect to the resins other than the above-mentioned fluororesin, the same resins as those constituting the single antiglare layer and the surface adjustment layer can be employed.

Low refractive index layers of these materials preferably have a refractive index of 1.45 or less, particularly a refractive index of 1.42 or less.

Further, the thickness of the low refractive index layer is not limited, but it may be appropriately set within a range of about 30 nm to 1 μm.

As the above-mentioned fluororesin, a polymerizable compound containing fluorine atoms at least in a molecule or a polymer thereof can be used. The polymerizable compound is not particularly limited, but for example, polymerizable compounds having a curing and reactive group such as a functional group to be cured by ionizing radiation, a thermosetting polar group or the like are preferable. Further, compounds having these reactive groups simultaneously together may also be used. In contrast to this polymerizable compound, the polymer is a polymer not having the above reactive group at all.

As polymerizable compounds having an ionizing radiation-curable group containing fluorine atoms, fluorine-containing monomers having an ethylenic unsaturated bond can be widely employed. More specifically, fluoroolefins (for example, fluoroethylene, vinylidene fluoride, tetrafluoroethylene, hexafluoropropylene, perfluorobutadiene, perfluoro-2,2-dimethyl-1,3-dioxole, etc.) can be exemplified. Examples of polymerizable compounds having a (meth)acryloyloxy group include a (meth)acrylate compound containing fluorine atoms in a molecule such as 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, α-trifluoromethylmethacrylic acid and α-trifluoroethylmethacrylic acid; and fluorine-containing polyfunctional (meth)acrylic acid ester compounds having a fluoroalkyl group, a fluorocycloalkyl group or a fluoroalkylene group, having 1 to 14 carbon atoms, which contains at least three fluorine atoms in a molecule, and at least two (meth)acryloyloxy groups.

As the thermosetting polar groups, for example, groups for forming a hydrogen bond such as a hydroxyl group, a carboxyl group, an amino group and an epoxy group are preferable. These groups are superior in not only the adhesion to a coat but also the affinity for an inorganic ultra fine particle such as silica. Examples of the polymerizable compounds having the thermosetting polar group include 4-fluoroethylene-perfluoroalkylvinylether copolymer; fluoroethylene-hydrocarbonvinylether copolymer; and fluorine modified products of various resins such as epoxy, polyurethane, cellulose, phenol and polyimide.

As the polymerizable compounds having the ionizing radiation-curable group and the thermosetting polar group together, partially and fully fluorinated alkyl, alkenyl, or aryl esters of acrylic acid or methacrylic acid, fully or partially fluorinated vinyl ethers, fully or partially fluorinated vinyl esters, and fully or partially fluorinated vinyl ketones can be exemplified.

Further, examples of fluororesins include the following compounds.

Polymers of a monomer or a mixture of monomers, containing at least one fluorine-containing (meth)acrylate compound of the polymerizable compounds having the ionizing radiation-curable group; copolymers of at least one of above-mentioned fluorine-containing (meth)acrylate compounds and a (meth)acrylate compound not containing a fluorine atom in a molecule like methyl (meth)acrylate, ethyl (meth)acrylate, propyl (meth)acrylate, butyl (meth)acrylate and 2-ethylhexyl (meth)acrylate; and homopolymers or copolymers of fluorine-containing monomers like fluoroethylene, vinylidene fluoride, trifluoroethylene, chlorotrifluoroethylene, 3,3,3-trifluoropropylene, 1,1,2-trichloro-3,3,3-trifluoropropylene and hexafluoropropylene. Silicone-containing vinylidene fluoride copolymer prepared by including a silicone component in these copolymers can also be used. Examples of the silicone component in this case include (poly)dimethylsiloxane, (poly)diethylsiloxane, (poly) diphenylsiloxane, (poly)methylphenylsiloxane, alkyl modified (poly) dimethylsiloxane, azo group-containing (poly)dimethylsiloxane, dimethylsilicone, phenylmethylsilicone, alkyl-aralkyl modified silicone, fluorosilicone, polyether modified silicone, fatty acid ester modified silicone, methyl hydrogen silicone, silanol group-containing silicone, alkoxy group-containing silicone, phenol group-containing silicone, methacryl modified silicone, acryl modified silicone, amino modified silicone, carboxylic acid modified silicone, carbinol modified silicone, epoxy modified silicone, mercapto modified silicone, fluorine modified silicone, polyether modified silicone, and the like. Among others, silicone components having a dimethylsiloxane structure are preferable.

Furthermore, non-polymers or polymers including the following compounds can also be used as a fluororesin. That is, compounds obtained by reacting a fluorine-containing compound having at least one isocyanate group in a molecule with a compound having at least one functional group, such as an amino group, a hydroxyl group or a carboxyl group, which reacts with an isocyanate group in a molecule; and compounds obtained by reacting fluorine-containing polyol such as fluorine-containing polyether polyols, fluorine-containing alkyl polyols, fluorine-containing polyester polyols or fluorine-containing ∈-caprolactone modified polyols with a compound having an isocyanate group can be used.

Further, together with the above-mentioned polymerizable compounds or polymers containing fluorine atoms, the respective resin components described in a paragraph of the single antiglare layer may also be mixed to be used. Furthermore, a curing agent for curing reactive groups, various kinds of additives for improving the coatability and imparting an antifouling property, and solvents may be appropriately used.

In the low refractive index layer, "fine particles having voids" are preferably used as a low refractive index agent. The "fine particles having voids" can reduce the refractive index of the low refractive index layer while maintaining layer strength of the low refractive index layer. In the present invention, the term "fine particles having voids" means particles having a structure in which the inside of the particle is filled with vapor and/or a porous structure including vapor is formed, and a characteristic that the refractive index is decreased in inverse proportion to a proportion which the vapor makes up of the particle compared with the particle's own refractive index. Further, in the present invention, the particle having voids includes a fine particle, in which a nano porous structure can be formed inside the coat and/or in at least a part of the coat surface, based on the configuration, the structure and the agglomerated state of the fine particles and the dispersed state of fine particles within a coat. The refractive index of the low refractive index layer using this particle can be adjusted to a refractive index of 1.30 to 1.45.

Examples of inorganic fine particles having voids include, for example, silica fine particles prepared by a method disclosed in Japanese Kokai Publication 2001-233611. Further, silica fine particles obtained by production methods described in such as Japanese Kokai Publication Hei-7-133105, Japanese Kokai Publication 2002-79616, and Japanese Kokai Publication 2006-106714, may be used. Since the silica particle having voids is easily produced and has high particle's own hardness, their layer strength is improved and it becomes possible to adjust the refractive index to a range of about 1.20 to 1.45 when the particles are mixed with the binder to form the refractive index layer. Particularly, specific preferable examples of organic fine particles having voids include hollow polymer particles prepared by use of a technique disclosed in Japanese Kokai Publication 2002-80503.

Examples of the fine particle, in which a nano porous structure can be formed inside the coat and/or in at least a part of the coat surface, include, in addition to the silica particles previously described, slow-release agents produced for the purpose of increasing a specific surface area, in which various chemical substances is adsorbed on a column for filling and a porous portion of the surface; porous particles used for fixing a catalyst; and dispersed substances or agglomerated substances of hollow particles for the purpose of incorporating in a heat insulating material or a low dielectric material. Specifically, it is possible to select and use the particles within the range of the preferable particle diameter of the present invention from agglomerated substances of porous silica fine particles of commercially available Nipsil or Nipgel (both trade name) produced by Nihon Silica Kogyo Co., Ltd., and colloidal silica UP series (trade name), having a structure in which silica fine particles are linked with one another in a chain form, produced by Nissan Chemical Industries, Ltd.

An average particle diameter of the "fine particle having voids" is 5 nm or more and 300 nm or less, and preferably, a lower limit is 8 nm and an upper limit is 100 nm, and more preferably, the lower limit is 10 nm and the upper limit is 80 nm. It becomes possible to impart excellent transparency to the low refractive index layer by having the average particle diameter of the fine particles of this range. In addition, the above average particle diameter was measured by a dynamic light-scattering method. An amount of the "particles having voids" is usually about 0.1 to 500 parts by weight with respect to 100 parts by weight of a matrix resin in the low refractive index layer, and preferably about 10 to 200 parts by weight.

In forming the low refractive index layer, it is preferable to set the viscosity of the composition for a low refractive index layer in a range of 0.5 to 5 cps (25° C.) where a preferable application property is attained, and preferably 0.7 to 3 cps (25° C.). An excellent antireflection coat of visible light can be realized, a uniform thin coat can be formed without producing irregularity of application, and a low refractive index layer having particularly excellent adhesion to the substrate can be formed.

Means for curing a resin may be the same one as described in a paragraph of the single antiglare layer. When heating means is used for curing the resin, preferably, a heat-polymerization initiator, which generates, for example, radicals by heat to initiate the polymerization of a polymerizable compound, is added to a fluororesin composition.

A layer thickness (nm) $d_A$ of the low refractive index layer preferably satisfies the following equation (V):

$$d_A = m\lambda/(4N_A) \tag{V}$$

wherein $n_A$ represents a refractive index of the low refractive index layer,
m represents a positive odd and preferably 1, and
$\lambda$ is a wavelength and preferably values from 480 to 580 nm.

Further, in the present invention, it is preferable from the viewpoint of reducing a reflectance that the low refractive index layer satisfies the following equation (VI):

$$120 < n_A d_A < 145 \tag{VI}$$

In accordance with another aspect of the present invention, the antiglare layer may include an antistatic layer (conductive layer) as an arbitrary layer.

Examples of a method for forming the antistatic layer include a method in which a conductive metal or a conductive metal oxide is deposited by vapor deposition or sputtered on the top surface of each layer of the optical layered body to form a vapor deposition film, or a method in which a coat is formed by applying a resin composition formed by dispersing conductive particles in a resin.

Examples of a method for forming the antistatic layer include a method in which a coating solution containing conductive fine particles and a curable resin is applied by an application method such as a roller coating method, a Mayer bar (metering coating rod) coating method or a gravure coating method and thereafter, drying and ultraviolet curing are performed.

When the antistatic layer is composed of the vapor deposition film, it is preferable to use a conductive metal or a conductive metal oxide as an antistatic agent, and examples thereof include antimony-doped indium-tin oxide (hereinafter, referred to as "ATO"), indium tin oxide (hereinafter, referred to as "ITO"), and the like. A thickness of the vapor deposition film as an antistatic layer is preferably 10 nm or more and 200 nm or less, and more preferably 100 nm or more and 50 nm or less.

The antistatic layer may be formed from a coating solution containing the above antistatic agent. The antistatic agent may be similar to those previously described in the surface adjustment layer.

In the formation of the antistatic layer, when a coat is formed by use of the conductive fine particles, a curable resin is preferably used. This curable resin may be similar to the resin composing the single antiglare layer.

Examples of a method for curing an ionizing radiation-curable resin composition include a method for curing by irradiation of electron beams or ultraviolet rays. In the case of electron beam curing, electron beams having energy of 100 KeV to 300 KeV are used. In the case of ultraviolet curing, ultraviolet light emitted from such as an ultra high-pressure mercury lamp, a high-pressure mercury lamp, a low-pressure mercury lamp, a carbon arc lamp, a xenon arc lamp or a metal halide lamp is used.

The light-transmitting substrate is preferably a substrate having smoothness and heat resistance, which is superior in mechanical strength. Specific examples of materials for forming the light-transmitting substrate include thermoplastic resins such as polyester (polyethylene terephthalate, polyethylene naphthalate), triacetyl cellulose, cellulose diacetate, cellulose acetate butylate, polyester, polyamide, polyimide, polyethersulfone, polysulfone, polypropylene, polymethylpentene, polyvinyl chloride, polyvinyl acetal, polyether ketone, polymethyl methacrylate, polycarbonate and polyurethane, and preferably include polyesters (polyethylene terephthalate, polyethylene naphthalate) and triacetyl cellulose.

As the light-transmitting substrate, a film of amorphous olefin polymer (Cyclo-Olefin-Polymer: COP) having an alicyclic structure can also be used. This is a substrate in which norbornene polymers, monocyclic olefin polymers, cyclic conjugated diene polymers, and vinyl alicyclic hydrocarbon polymer resins are used, and examples of this amorphous olefin polymer include ZEONEX or ZEONOA (norbornene resin) manufactured by ZEON Corporation, SUMILITE FS-1700 manufactured by SUMITOMO BAKELITE Co., Ltd., ARTON (modified norbornene resin) manufactured by JSR Corp., APEL (cyclic olefin copolymer) manufactured by Mitsui Chemicals, Inc., TOPAS (cyclic olefin copolymer) manufactured by Ticona Inc. and OPTOREZ OZ-1000 series (alicyclic acrylic resin) manufactured by Hitachi Chemical Co., Ltd. Further, FV series (low birefringence and low photoelastic coefficient film) manufactured by Asahi Kasei Chemicals Corporation are also preferable as an alternative substrate of triacetyl cellulose.

As the light-transmitting substrate, the thermoplastic resin is preferably used in a film form, which is rich in flexibility, but plates of these thermoplastic resins may be used or plate-like bodies of glass plate may also be used in accordance with the mode of use requiring a curing property.

Preferably, the thickness of the light-transmitting substrate is 20 μm or more and 300 μm or less, and more preferably, an upper limit of the thickness is 200 μm and a lower limit is 30 μm. When the light-transmitting substrate is a plate-like body, the thickness of the light-transmitting substrate may be more than this thickness (300 μm to about 10 mm). The substrate may have been subjected to application of an anchor agent or a coating composition referred to as a primer in advance in addition to physical treatments such as a corona discharge treatment and an oxidation treatment in order to improve the adhesive property of the substrate when the antiglare layer is formed on the substrate.

The optical layered body obtained by the method for producing an optical layered body of the present invention also constitutes the present invention. With respect to a surface roughness of the optical layered body thus obtained, if denoting a mean spacing of profile irregularities by Sm, a mean inclination angle of profile irregularities by θa, and mean roughness of the surface roughness by Rz, Sm is 50 μm or more and less than 100

θa is 0.1° or more and 1.0° or less, and

Rz is more than 0.2 μm and 1.0 μm or less.

By adapting Sm, θa and Rz to satisfy these values, effects can be particularly suitably achieved.

That is, the optical characteristics are controlled by controlling the shape of the surface of the optical layered body of the present invention. Here, the "surface of the optical layered body" means the outermost surface of the antiglare layer adjacent to air in any of the cases where the antiglare layer is a single layer, the antiglare layer is composed of the under coat rough surface layer and the surface adjustment layer, or the antiglare layer further has the low refractive index layer and/or arbitrary layer, and optical characteristic values of the surface roughness of the outermost surface are coincident with the optical characteristic values of the surface roughness of the optical layered body in the present invention.

Definitions and measuring methods of various parameters required in the present invention will be described below.

Measurement of Refractive Index

The refractive index of a cured coat such as a surface adjustment layer was measured according to JIS K 7142 using an Abbe refractometer.

Measurement of Refractive Index, Layer Thickness

The refractive index and the layer thickness can also be measured by the following method in addition to the method described above. A spectral reflectance of a film formed by laminating a layer, measurement of which is desired, was measured as a specular reflectance at an incidence angle of 5° in a wavelength range of 380 to 780 nm by a spectrophotometer MPC 3100 manufactured by Shimadzu Corporation (in addition, when a specular reflectance at an incidence angle of 5° was measured, a black tape (manufactured by Teraoka Seisakusho Co., Ltd.) was stuck on the side opposite to a face of the film to be measured in order to prevent back reflection of the film which is an optical layered body), and a thickness of an optical layer was determined from a $\lambda/4$ value of the spectrum to calculate a refractive index based on the thickness of an optical layer. Also, a layer thickness was determined from the results of reflection spectrum. Here, a refractive index at a wavelength of 550 nm was adopted as a typical value.

The method for producing an optical layered body of the present invention includes a step of applying a composition for forming an antiglare layer onto the light-transmitting substrate to form an antiglare layer.

Examples of the above composition for an antiglare layer include compositions for an antiglare layer such as the composition for an antiglare layer and the composition for forming a single antiglare layer, which contains a resin and fine particles and, described above.

The above method for applying a composition and the above method for forming an antiglare layer are not particularly limited, and examples thereof include the same method for applying a composition and the same method for forming an antiglare layer as those described in the formation of the single antiglare layer described above. Such a method for producing an optical layered body also constitutes the present invention.

A polarizer can be formed by providing the optical layered body of the present invention on the surface of a polarizing element opposed to a face where an antiglare layer of the optical layered body is present. Such a polarizer also constitutes the present invention.

The above-mentioned polarizing element is not particularly limited, and as the polarizing element, for example, a polyvinyl alcohol film, a polyvinyl formal film, a polyvinyl acetal film or an ethylene-vinyl acetate copolymer saponified film, which is dyed with iodine or the like and stretched, can be used. In laminating the polarizing element and the optical layered body of the present invention, preferably, the light-transmitting substrate (preferably triacetyl cellulose film) is subjected to a saponification treatment. By the saponification treatment, adhesion becomes good and an antistatic effect can be attained.

An image display device including a light-transmitting display and a light source apparatus to irradiate the above-mentioned light-transmitting display from the backside, characterized by including the optical layered body of the present invention or the polarizer of the present invention at the surfaces of the above-mentioned light-transmitting display, also constitutes the present invention.

The image display device in accordance with the present invention may be basically composed of a light source apparatus, a display element and the optical layered body in accordance with the present invention. The image display device is used for transmissive displays, particularly for displays of televisions, computers, word processors or the like. Particularly, it is used for the surfaces of displays for high definition images such as CRTs, PDPs, liquid crystal panels, and the like.

When the image display device in accordance with the present invention is a liquid crystal display device, a light source of the light source apparatus irradiates from the under-side of the optical layered body in accordance with the present invention. In addition, in the STN type liquid crystal display device, a retardation plate may be inserted between a liquid crystal display element and the polarizer. An adhesive layer may be provided between the respective layers of this liquid crystal display device as required.

Effect of the Invention

In accordance with the optical layered body of the present invention, properties such as an antiglare property, scintillation prevention and black color reproducibility such as gloss blackness can be attained simultaneously.

BRIEF DESCRIPTIONS OF THE DRAWINGS

BEST MODE FOR CARRYING OUT THE INVENTION

Figure 1:
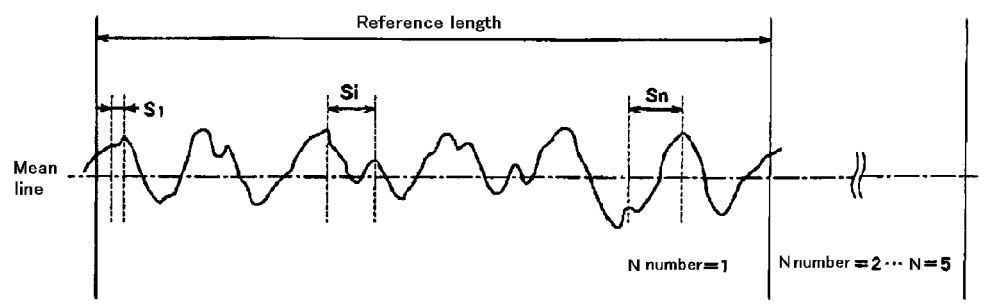
FIG. 1 is a schematic view for illustrating a calculation method of S.

Hereinafter, the present invention will be described in more detail based on Examples.

EXAMPLES

The contents of the present invention will be described by way of the following embodiments, but the contents of the present invention are not to be construed to limit to these embodiments. "Part(s)" and "%" refer to "part (s) by weight" and "% by weight", unless otherwise specified.
Compositions for Single Antiglare Layer
Composition 1 for Single Antiglare Layer
(Ultra Violet Curable Resin)
  Pentaerythritol triacrylate (PETA) (manufactured by Nippon Kayaku Co., Ltd., refractive index 1.51) 65 parts by weight
  Isocyanuric acid modified diacrylate M-215 (manufactured by Toagosei Co., Ltd.) 35 parts by weight
  Polymethyl methacrylate (Molecular weight 75000) 10 parts by weight
(Photo-Curing Initiator)
  Irgacure 184 (manufactured by Ciba Specialty Chemicals Inc.) 6 parts by weight
  Irgacure 907 (manufactured by Ciba Specialty Chemicals Inc.) 1 part by weight
(First Light-Transmitting Fine Particle)
  Monodisperse acrylic bead (particle diameter 9.0 μm, refractive index 1.535) 10 parts by weight
(Second Light-Transmitting Fine Particle)
  Styrene bead (manufactured by Soken Chemical & Engineering Co., Ltd., particle diameter 3.5 μm, refractive index 1.60) 14 parts by weight
(Leveling Agent)
  Silicone leveling agent (manufactured by Dainichiseika Color & Chemicals Mfg. Co., Ltd.) 0.045 parts by weight
(Solvent)
  Toluene 64 parts by weight
  Cyclohexanone 16 parts by weight
  A composition was prepared by adequately mixing the above materials. This composition was filtrated with a polypropylene filter having a pore size of 30 μm to prepare a composition 1 for a single antiglare layer having a solid content of 60% by weight.
Composition 2 for Single Antiglare Layer
(Ultra Violet Curable Resin)
  Pentaerythritol triacrylate (PETA) (refractive index 1.51) 20 parts by weight
  Polymethyl methacrylate (Molecular weight 75000) 1 part by weight
(Photo-Curing Initiator)
  Irgacure 184 (manufactured by Ciba Specialty Chemicals Inc.) 1.2 parts by weight
  Irgacure 907 (manufactured by Ciba Specialty Chemicals Inc.) 0.2 parts by weight
(Fine Particle)
  Monodisperse styrene bead (particle diameter 3.5 μm, refractive index 1.60) 1.2 parts by weight
(Leveling Agent)
  Silicone leveling agent 10-28 (manufactured by Dainichiseika Color & Chemicals Mfg. Co., Ltd.) 0.012 parts by weight
(Solvent)
  Toluene 37.2 parts by weight
  Methyl isobutyl ketone 6.6 parts by weight
  A composition was prepared by adequately mixing the above materials. This composition was filtrated with a polypropylene filter having a pore size of 30 μm to prepare a composition 2 for a single antiglare layer having a solid content of 35% by weight.
Composition 3 for Single Antiglare Layer
(Ultra Violet Curable Resin)
  Pentaerythritol triacrylate (PETA) (refractive index 1.51) 12.0 parts by weight
  Isocyanuric acid modified diacrylate M-215 (manufactured by Toagosei Co., Ltd.) 8.0 parts by weight
  Polymethyl methacrylate (Molecular weight 75000) 2 parts by weight
(Photo-Curing Initiator)
  Irgacure 184 (manufactured by Ciba Specialty Chemicals Inc.) 1.32 parts by weight
  Irgacure 907 (manufactured by Ciba Specialty Chemicals Inc.) 0.22 parts by weight
(First Light-Transmitting Fine Particle)
  Monodisperse styrene-acrylic copolymer bead (particle diameter 3.5 μm, refractive index 1.555) 4.84 parts by weight
(Second Light-Transmitting Fine Particle)
  Monodisperse styrene bead (particle diameter 3.5 μm, refractive index 1.60) 0.55 parts by weight
(Leveling Agent)
  Silicone leveling agent (manufactured by Dainichiseika Color & Chemicals Mfg. Co., Ltd.) 0.0077 parts by weight
  A composition was prepared by adding a solvent of toluene and cyclohexanone in proportions of 6:4 to the above materials so as to be 38% by weight in a total solid content and adequately mixing the resulting mixture. This composition was filtrated with a polypropylene filter having a pore size of 30 μm to prepare a composition 3 for a single antiglare layer.
Composition 4 for Single Antiglare Layer
(Ultra Violet Curable Resin)
Polyfunctional urethane acrylate UV-1700B (manufactured by Nippon Synthetic Chemical Industry Co., Ltd., refractive index 1.51) 16 parts by weight
Isocyanuric acid modified diacrylate M-215 (manufactured by Toagosei Co., Ltd.) 2 parts by weight
Polymethyl methacrylate (Molecular weight 75000) 2 parts by weight
(Photo-Curing Initiator)
Irgacure 184 (manufactured by Ciba Specialty Chemicals Inc.) 1.2 parts by weight
Irgacure 907 (manufactured by Ciba Specialty Chemicals Inc.) 0.2 parts by weight
(Fine Particle)
Monodisperse styrene bead (particle diameter 3.5 μm, refractive index 1.60) 0.6 parts by weight
(Leveling Agent)
Silicone leveling agent 10-28 (manufactured by Dainichiseika Color & Chemicals Mfg. Co., Ltd.) 0.0132 parts by weight A composition was prepared by adding a solvent of toluene and cyclohexanone in proportions of 6:4 to the above materials so as to be 40% by weight in a total solid content and adequately mixing the resulting mixture. This composition was filtrated with a polypropylene filter having a pore size of 30 μm to prepare a composition 4 for a single antiglare layer.
Composition 5 for Single Antiglare Layer
(First Light-Transmitting Fine Particle)
Monodisperse acrylic bead (particle diameter 2.0 μm, refractive index 1.535) 10 parts by weight
(Second Light-Transmitting Fine Particle)
Monodisperse styrene bead (particle diameter 2.0 μm, refractive index 1.60) 7 parts by weight
(Third Light-Transmitting Fine Particle)
Nonspherical silica: average particle diameter 1.0 μm 2 parts by weight
(Ultra Violet Curable Resin)
Pentaerythritol triacrylate (PETA) (refractive index 1.51) 100 parts by weight
(Photo-Curing Initiator)
Irgacure 184 (manufactured by Ciba Specialty Chemicals Inc.) 6 parts by weight
Irgacure 907 (manufactured by Ciba Specialty Chemicals Inc.) 1 part by weight
(Polymer)
Polymethyl methacrylate (Molecular weight 75000) 10 parts by weight
(Leveling Agent)
Silicone leveling agent 0.045 parts by weight
(Solvent)
Toluene 164.8 parts by weight
Cyclohexanone 41.2 parts by weight
The above materials were appropriately added and the resulting mixture was adequately mixed to prepare a composition. This composition was filtrated with a polypropylene filter having a pore size of 30 μm to form a composition 5 for a single antiglare layer having a solid content of 40.5% by weight.
Compositions for Under Coat Rough Surface Layer
Composition 1 for Under Coat Rough Surface Layer
(Ultra Violet Curable Resin)
Pentaerythritol triacrylate (PETA) (refractive index 1.51) 2.18 parts by weight
Dipentaerythritol hexaacrylate (DPHA) (refractive index 1.51) 0.98 parts by weight
Polymethyl methacrylate (Molecular weight 75000) 0.31 parts by weight
(Photo-Curing Initiator)
Irgacure 184 (manufactured by Ciba Specialty Chemicals Inc.) 0.20 parts by weight
Irgacure 907 (manufactured by Ciba Specialty Chemicals Inc.) 0.03 parts by weight
(First Light-Transmitting Fine Particle)
Monodisperse acrylic bead (particle diameter 9.5 μm, refractive index 1.535) 0.74 parts by weight
(Second Light-Transmitting Fine Particle)
Nonspherical silica ink (average particle diameter 1.5 μm, solid content 60%, silica component is 15% of a total solid content)
1.46 parts by weight
(Leveling Agent)
Silicone leveling agent (manufactured by Dainichiseika Color & Chemicals Mfg. Co., Ltd.) 0.02 parts by weight
(Solvent)
Toluene 5.53 parts by weight
Anone 1.55 parts by weight
A composition having a solid content of 40.5% by weight was prepared by adequately mixing the above materials. This composition was filtrated with a polypropylene filter having a pore size of 30 μm to prepare a composition 1 for an under coat rough surface layer.
Composition 2 for under coat rough surface layer
(Ultra Violet Curable Resin)
Pentaerythritol triacrylate (PETA) (refractive index 1.51) 2.20 parts by weight
Isocyanuric acid modified diacrylate M-215 (manufactured by Nippon Kayaku Co., Ltd., refractive index 1.51) 1.21 parts by weight
Polymethyl methacrylate (Molecular weight 75000) 0.34 parts by weight
(Photo-Curing Initiator)
Irgacure 184 (manufactured by Ciba Specialty Chemicals Inc.) 0.22 parts by weight
Irgacure 907 (manufactured by Ciba Specialty Chemicals Inc.) 0.04 parts by weight
(First Light-Transmitting Fine Particle)
Monodisperse acrylic bead (particle diameter 9.5 μm, refractive index 1.535) 0.82 parts by weight
(Second Light-Transmitting Fine Particle)
Nonspherical silica ink (average particle diameter 1.5 μm, solid content 60%, silica component is 15% of a total solid content)
1.73 parts by weight
(Leveling Agent)
Silicone leveling agent (manufactured by Dainichiseika Color & Chemicals Mfg. Co., Ltd.) 0.02 parts by weight
(Solvent)
Toluene 5.88 parts by weight
Anone 1.55 parts by weight
A composition having a solid content of 40.5% by weight was prepared by adequately mixing the above materials. This composition was filtrated with a polypropylene filter having a pore size of 30 μm to prepare a composition 2 for an under coat rough surface layer.
Composition 3 for Under Coat Rough Surface Layer
(First Light-Transmitting Fine Particle)
Monodisperse acrylic bead (particle diameter 7.0 μm, refractive index 1.535) 20 parts by weight (Second Light-Transmitting Fine Particle)
Monodisperse styrene bead (particle diameter 3.5 μm, refractive index 1.60) 16.5 parts by weight
(Third Light-Transmitting Fine Particle)
Nonspherical silica: average particle diameter 2.5 μm 2 parts by weight
(Ultra Violet Curable Resin)
Pentaerythritol triacrylate (PETA) (refractive index 1.51) 100 parts by weight
(Photo-Curing Initiator)
Irgacure 184 (manufactured by Ciba Specialty Chemicals Inc.) 6 parts by weight
Irgacure 907 (manufactured by Ciba Specialty Chemicals Inc.) 1 part by weight
(Polymer)
Polymethyl methacrylate (Molecular weight 75000) 10 parts by weight
(Leveling Agent)
Silicone leveling agent 0.045 parts by weight
(Solvent)
Toluene 174.4 parts by weight
Cyclohexanone 43.6 parts by weight
The above materials were appropriately added and the resulting mixture was adequately mixed to prepare a composition. This composition was filtrated with a polypropylene filter having a pore size of 30 μm to form a composition 3 for an under coat rough surface layer having a solid content of 40.5% by weight.
Composition 4 for Under Coat Rough Surface Layer
(First Light-Transmitting Fine Particle)
Monodisperse acrylic bead (particle diameter 7.0 μm, refractive index 1.535) 20 parts by weight
(Second Light-Transmitting Fine Particle)
Monodisperse styrene bead (particle diameter 3.5 μm, refractive index 1.60) 2.5 parts by weight
(Third Light-Transmitting Fine Particle)
Nonspherical silica: average particle diameter 2.5 μm 2 parts by weight
(Ultra Violet Curable Resin)
Pentaerythritol triacrylate (PETA) (manufactured by Nippon Kayaku Co., Ltd., refractive index 1.51) 100 parts by weight
(Photo-Curing Initiator)
Irgacure 184 (manufactured by Ciba Specialty Chemicals Inc.) 6 parts by weight
Irgacure 907 (manufactured by Ciba Specialty Chemicals Inc.) 1 part by weight
(Polymer)
Polymethyl methacrylate (Molecular weight 75000) 10 parts by weight
(Leveling Agent)
Silicone leveling agent 0.045 parts by weight
(Solvent)
Toluene 158 parts by weight
Cyclohaxanona 39.5 parts by weight
The above materials were appropriately added and the resulting mixture was adequately mixed to prepare a composition.
This composition was filtrated with a polypropylene filter having a pore size of 30 μm to form a composition 4 for an under coat rough surface layer having a solid content of 40.5% by weight.
Compositions for Light Diffusion
Composition 1 for Light Diffusion
Resin (VYLON 200 polyester manufactured by TOYOBO Co., Ltd.) 100 parts by weight
Light diffusing agent (MBX-8 manufactured by SEKISUI PLASTICS CO., Ltd.: average particle diameter 10 μm) 240 parts by weight
Diluting solvent: Toluene 130 parts by weight
: Methyl ethyl ketone 100 parts by weight (solid content 50%)
The above materials were adequately mixed to prepare a composition and the resulting composition was filtrated with a polypropylene filter having a pore size of 30 μm to form a composition 1 for light diffusion having a solid content of 50% by weight.
Light Diffusing Film
Light Diffusing Film 1
A light diffusing film "trade name: D122" (manufactured by Tsujiden Co., Ltd.) having a thickness of 120 μm was used as a light diffusing layer. The light-transmitting substrate of this light diffusing film was a polyethylene terephthalate film.
Composition 1 for Surface Adjustment Layer
(Ultra Violet Curable Resin)
UV-1700B (manufactured by Nippon Synthetic Chemical Industry Co., Ltd., refractive index 1.51) 31.1 parts by weight
Aronix M-315 (trade name, triacrylate of an ethylene oxide (3 moles) addition product of isocyanuric acid manufactured by Toagosei Co., Ltd.) 10.4 parts by weight
(Photo-Curing Initiator)
Irgacure 184 (manufactured by Ciba Specialty Chemicals Inc.) 1.49 parts by weight
Irgacure 907 (manufactured by Ciba Specialty Chemicals Inc.) 0.41 parts by weight
(Antifouling Agent)
UT-3971 (manufactured by Nippon Synthetic Chemical Industry Co., Ltd.) 2.07 parts by weight
(Solvent)
Toluene 48.76 parts by weight
Cyclohexanone 5.59 parts by weight
A composition was prepared by adequately mixing the above components.
This composition was filtrated with a polypropylene filter having a pore size of 10 μm to prepare a composition 1 for a surface adjustment layer having a solid content of 45% by weight.
Composition 2 for Surface Adjustment Layer
(Ultra Violet Curable Resin)
UV-1700B (manufactured by Nippon Synthetic Chemical Industry Co., Ltd., refractive index 1.51) 31.1 parts by weight
Aronix M-315 (trade name, triacrylate of an ethylene oxide (3 moles) addition product of isocyanuric acid manufactured by Toagosei Co., Ltd.) 10.4 parts by weight
(Photo-Curing Initiator)
Irgacure 184 (manufactured by Ciba Specialty Chemicals Inc.) 1.49 parts by weight
Irgacure 907 (manufactured by Ciba Specialty Chemicals Inc.) 0.41 parts by weight
(Antifouling Agent)
UT-3971 (manufactured by Nippon Synthetic Chemical Industry Co., Ltd.) 2.07 parts by weight
(Solvent)
Toluene 525.18 parts by weight
Cyclohexanone 60.28 parts by weight
A composition was prepared by adequately mixing the above components.
This composition was filtrated with a polypropylene filter having a pore size of 10 μm to prepare a composition 2 for a surface adjustment layer having a solid content of 40.5% by weight.

Composition 3 for Surface Adjustment Layer (P/V=30/100)
Colloidal silica slurry (MIBK dispersion); solid content 40%, average particle diameter 20 nm
2.91 parts by weight
(Ultra Violet Curable Resin)
UV-1700B (ultra violet curable resin; manufactured by Nippon Synthetic Chemical Industry Co., Ltd., solid content 60% MIBK) 6.10 parts by weight
Aronix M-215 (ultra violet curable resin; diacrylate of an ethylene oxide (2 moles) addition product of isocyanuric acid manufactured by Toagosei Co., Ltd. solid content 60% MIBK)
1.52 parts by weight
(Photo-Curing Initiator)
Irgacure 184 (Photo-curing initiator; manufactured by Ciba Specialty Chemicals Inc.) 0.018 parts by weight
Irgacure 907 (Photo-curing initiator; manufactured by Ciba Specialty Chemicals Inc.) 0.003 parts by weight
(Leveling Agent)
Silicone leveling agent 10-28 (manufactured by Dainichiseika Color & Chemicals Mfg. Co., Ltd.) 0.0085 parts by weight
(Solvent)
MIBK: methyl isobutyl ketone 2.06 parts by weight
Cyclohexanone 0.41 parts by weight
A composition was prepared by adequately mixing the above components. This composition was filtrated with a polypropylene filter having a pore size of 30 μm to prepare a composition 3 for a surface adjustment layer having a solid content of 45% by weight.

Composition 4 for Surface Adjustment Layer (P/V=10/100)
Colloidal silica slurry (MIBK dispersion); solid content 40%, average particle diameter 20 nm
0.25 parts by weight
(Ultra Violet Curable Resin)
UV-1700B (ultra violet curable resin; manufactured by Nippon Synthetic Chemical Industry Co., Ltd., solid content 60% MIBK) 1.58 parts by weight
Aronix M-315 (ultra violet curable resin; manufactured by Toagosei Co., Ltd., solid content 60% MIBK) 0.40 parts by weight
(Photo-Curing Initiator)
Irgacure 184 (Photo-curing initiator; manufactured by Ciba Specialty Chemicals Inc.) 0.118 parts by weight
Irgacure 907 (Photo-curing initiator; manufactured by Ciba Specialty Chemicals Inc.) 0.019 parts by weight
(Antifouling Agent)
UT-3971 (solid content 30% MIBK solution; manufactured by Nippon Synthetic Chemical Industry Co., Ltd.) 0.002 parts by weight
(Solvent)
Toluene 8.89 parts by weight
Cyclohexanone 1.88 parts by weight
A composition was prepared by adequately mixing the above components. This composition was filtrated with a polypropylene filter having a pore size of 30 μm to prepare a composition 4 for a surface adjustment layer having a solid content of 10% by weight.

Example 1

Formation of Under Coat Rough Surface Layer

Using a triacetyl cellulose film (TD 80U, manufactured by FUJIFILM Corporation) having a thickness of 80 μm as a transparent substrate, the composition 1 for an under coat rough surface layer was applied onto the film with a wire wound rod for coating (Mayer bar (metering coating rod)) #14, and the applied composition 1 was heated to dry for 1 minute in an oven of 70° C. to evaporate the solvent fraction, and then a coat was hardened by irradiating the coat with ultraviolet light in such a way that an exposure becomes 30 mJ to form an under coat rough surface layer.

Formation of Surface Adjustment Layer

Furthermore, the composition 1 for a surface adjustment layer was applied onto the under coat rough surface layer with a wire wound rod for coating (Mayer bar (metering coating rod)) #12, and the applied composition 1 was heated to dry for 1 minute in an oven of 70° C. to evaporate the solvent fraction, and then a coat was cured by irradiating the coat with ultraviolet light in such away that an exposure becomes 100 mJ under nitrogen purge (oxygen content 200 ppm or less) to form a surface adjustment layer to obtain an antiglare optical layered body. (The total thickness of the antiglare layer on the substrate: about 16.5 μm)

Example 2

Formation of Under Coat Rough Surface Layer

Using a triacetyl cellulose film (TD 80U, manufactured by FUJIFILM Corporation) having a thickness of 80 μm as a transparent substrate, the composition 4 for an under coat rough surface layer was applied onto the film with a wire wound rod for coating (Mayer bar (metering coating rod)) #14, and the applied composition 4 was heated to dry for 1 minute in an oven of 70° C. to evaporate the solvent fraction, and then a coat was cured by irradiating the coat with ultraviolet light in such a way that an exposure becomes 30 mJ to form an under coat rough surface layer. Use of the fine particle, in which a difference in refractive indexes between the fine particle and the binder resin was up to 0.09, in the under coat rough surface layer made it possible to exert an internal diffusion effect and to prevent scintillation more effectively.

Formation of Surface Adjustment Layer

Furthermore, the composition 3 for a surface adjustment layer was applied onto the under coat rough surface layer with a wire wound rod for coating (Mayer bar (metering coating rod)) #10, and the applied composition 3 was heated to dry for 1 minute in an oven of 70° C. to evaporate the solvent fraction, and then a coat was cured by irradiating the coat with ultraviolet light in such away that an exposure becomes 100 mJ under nitrogen purge (oxygen content 200 ppm or less) to form a surface adjustment layer to obtain an antiglare optical layered body. (The total thickness of the antiglare layer on the substrate: about 12.5 μm)

Example 3

Formation of Under Coat Rough Surface Layer

Using a triacetyl cellulose film (TD 80U, manufactured by FUJIFILM Corporation) having a thickness of 80 μm as a transparent substrate, the composition 3 for an under coat rough surface layer was applied onto the film with a wire wound rod for coating (Mayer bar (metering coating rod)) #14, and the applied composition 3 was heated to dry for 1 minute in an oven of 70° C. to evaporate the solvent fraction, and then a coat was cured by irradiating the coat with ultraviolet light in such a way that an exposure becomes 30 mJ to form an under coat rough surface layer. Use of the fine particle, in which a difference in refractive indexes between the fine particle and the binder resin was up to 0.09, in the under coat rough surface layer made it possible to exert an internal diffusion effect and to prevent scintillation more effectively.
Formation of Surface Adjustment Layer Furthermore, the composition 3 for a surface adjustment layer was applied onto the under coat rough surface layer with a wire wound rod for coating (Mayer bar (metering coating rod)) #8, and the applied composition 3 was heated to dry for 1 minute in an oven of 70° C. to evaporate the solvent fraction, and then a coat was cured by irradiating the coat with ultraviolet light in such away that an exposure becomes 100 mJ under nitrogen purge (oxygen content 200 ppm or less) to form a surface adjustment layer to obtain an antiglare optical layered body. (The total thickness of the antiglare layer on the substrate: about 10.5 μm)

Example 4

Formation of Under Coat Rough Surface Layer

Using a biaxial stretching polyethylene terephthalate film (manufactured by TOYOBO Co., Ltd., trade name "A4300") having a thickness of 100 μm as a transparent substrate, the composition 2 for an under coat rough surface layer was applied onto the film with a wire wound rod for coating (Mayer bar (metering coating rod)) #14, and the applied composition 2 was heated to dry for 1 minute in an oven of 70° C. to evaporate the solvent fraction, and then a coat was cured by irradiating the coat with ultraviolet light in such a way that an exposure becomes 30 mJ to form an under coat rough surface layer.
Formation of Surface Adjustment Layer Furthermore, the composition 2 for a surface adjustment layer was applied onto the under coat rough surface layer with a wire wound rod for coating (Mayer bar (metering coating rod)) #10, and the applied composition 2 was heated to dry for 1 minute in an oven of 70° C. to evaporate the solvent fraction, and then a coat was cured by irradiating the coat with ultraviolet light in such away that an exposure becomes 100 mJ under nitrogen purge (oxygen content 200 ppm or less) to form a surface adjustment layer to obtain an antiglare optical layered body. (The total thickness of the antiglare layer on the substrate: about 15.0 μm)

Example 5

Formation of Antiglare Layer

Using a triacetyl cellulose film (TD 80U, manufactured by FUJIFILM Corporation) having a thickness of 80 μm as a transparent substrate, the composition 5 for a single antiglare layer was applied onto the film with a wire wound rod for coating (Mayer bar (metering coating rod)) #5, and the applied composition 5 was heated to dry for 1 minute in an oven of 70° C. to evaporate the solvent fraction, and then a coat was cured by irradiating the coat with ultraviolet light in such away that an exposure becomes 100 mJ under nitrogen purge (oxygen content 200 ppm or less) to form an antiglare optical layered body. Use of the fine particle, in which a difference in refractive indexes between the fine particle and the binder resin was up to 0.09, in the underlying antiglare layer made it possible to exert an internal diffusion effect and to prevent scintillation more effectively. (The total thickness of the antiglare layer on the substrate: about 3.2 μm)

Example 6

Formation of Antiglare Layer

Using a triacetyl cellulose film (TD 80U, manufactured by FUJIFILM Corporation) having a thickness of 80 μm as a transparent substrate, the composition 1 for a single antiglare layer was applied onto the film with a wire wound rod for coating (Mayer bar (metering coating rod)) #24, and the applied composition 1 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form an antiglare optical layered body. Use of the fine particle, in which a difference in refractive indexes between the fine particle and the binder resin was up to 0.09, in the underlying antiglare layer made it possible to exert an internal diffusion effect and to prevent scintillation more effectively. (The total thickness of the antiglare layer on the substrate: about 20 μm)

Comparative Example 1

Formation of Under Coat Rough Surface Layer

Using a triacetyl cellulose film (TD 80U, manufactured by FUJIFILM Corporation) having a thickness of 80 μm as a transparent substrate, the composition 2 for a single antiglare layer was used as a composition for an under coat rough surface layer and was applied onto the film with a wire wound rod for coating (Mayer bar (metering coating rod)) #8, and the applied composition 2 was heated to dry for 1 minute in an oven of 70° C. to evaporate the solvent fraction, and then a coat was cured by irradiating the coat with ultraviolet light in such away that an exposure becomes 30 mJ to form an under coat rough surface layer. Use of the fine particle, in which a difference in refractive indexes between the fine particle and the binder resin was up to 0.09, in the under coat rough surface layer made it possible to exert an internal diffusion effect and to prevent scintillation more effectively.
Formation of Surface Adjustment Layer Furthermore, the composition 2 for a surface adjustment layer was applied onto the under coat rough surface layer with a wire wound rod for coating (Mayer bar (metering coating rod)) #2, and the applied composition 1 was heated to dry for 1 minute in an oven of 70° C. to evaporate the solvent fraction, and then a coat was cured by irradiating the coat with ultraviolet light in such away that an exposure becomes 100 mJ under nitrogen purge (oxygen content 200 ppm or less) to form a surface adjustment layer to obtain an antiglare optical layered body. (The total thickness of the antiglare layer on the substrate: 7.6 μm)

Comparative Example 2

Formation of Antiglare Layer

Using a triacetyl cellulose film (TD 80U, manufactured by FUJIFILM Corporation) having a thickness of 80 μm as a transparent substrate, the composition 3 for an under coat rough surface layer was used as a composition for an antiglare layer and was applied onto the film with a wire wound rod for coating (Mayer bar (metering coating rod)) #12, and the applied composition 3 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content 200 ppm or less) to form an antiglare optical layered body. Use of the fine particle, in which a difference in refractive indexes between the fine particle and the binder resin was up to 0.09, in the antiglare layer made it possible to exert an internal diffusion effect and to prevent scintillation. This antiglare layer has an appearance in which fine particles stuck their tops out of the binder resin. (The total thickness of the antiglare layer on the substrate: about 4.5 μm)

Comparative Example 3

Formation of Antiglare Layer

Using a triacetyl cellulose film (TD 80U, manufactured by FUJIFILM Corporation) having a thickness of 80 μm as a transparent substrate, the composition 3 for a single antiglare layer was applied onto the film with a wire wound rod for coating (Mayer bar (metering coating rod)) #8, and the applied composition 3 was heated to dry for 1 minute in an oven of 70° C. to evaporate the solvent fraction, and then a coat was cured by irradiating the coat with ultraviolet light in such away that an exposure becomes 100 mJ under nitrogen purge (oxygen content below 200 ppm) to form an antiglare optical layered body. (The total thickness of the antiglare layer on the substrate: about 4.0 μm)

Comparative Example 4

Formation of Antiglare Layer

Using a triacetyl cellulose film (TD 80U, manufactured by FUJIFILM Corporation) having a thickness of 80 μm as a transparent substrate, the composition 4 for a single antiglare layer was applied onto the film with a wire wound rod for coating (Mayer bar (metering coating rod)) #34, and the applied composition 4 was heated to dry for 1 minute in an oven of 70° C. to evaporate the solvent fraction, and then a coat was cured by irradiating the coat with ultraviolet light in such a way that an exposure becomes 100 mJ under nitrogen purge (oxygen content below 200 ppm) to form an antiglare optical layered body. (The total thickness of the antiglare layer on the substrate: about 23 μm)

The obtained optical layered bodies of Examples and Comparative Examples were evaluated according to the following evaluation method and the results of measurements are shown in Table 4.

Haze, layer thickness, mean spacing of tops of local peak of profile, surface roughness A haze value (%), a layer thickness H (μm), a mean spacing of tops of local peak of profile S (mm), and surface roughness (Sm, θa, Rz) were measured. The layer thickness, the mean spacing of tops of local peak of profiles, and the surface roughness (Sm, θa, Rz) were measured according to the definitions of the present description.

The haze value can be measured according to JIS K-7136. Examples of the equipment used for measurement include a reflection and transmittance meter HR-150 (manufactured by Murakami Color Research Laboratory Co., Ltd.). The haze is measured with the coated surface directed to a light source.

Surface haze can be measured in the following manner. A resin solution prepared by diluting a resin (including resin components such as monomer and oligomer) such as pentaerythritol triacrylate with toluene so as to be 60% in solid content is applied onto the surface roughness of the outermost surface of the optical layered body in such a way that a dried film thickness is 8 μm with a wire bar. Accordingly, the surface roughness of the antiglare layer is buried and the outermost layer becomes a smooth layer. When a composition constituting the optical layered body contains a leveling agent and therefore a re-coating agent tends to be repelled and hard to become wet, an antiglare film may previously be subjected to a saponification treatment (film is immersed in a 2 mol/liter NaOH (or KOH) solution of 55° C. for 3 minutes, and then the film is washed with water and the water droplets are wiped thoroughly with Kim-Wipe, and then the film is dried in an oven of 50° C. for 1 minute) to carryout a hydrophilic treatment. This film with the leveled surface becomes a state of not having haze due to the surface roughness but having only internal haze. This haze can be determined as an internal haze. And, by subtracting the internal haze from haze (total haze) of the original film, haze (surface haze) resulting from only the surface roughness is determined.

Measurement of Arithmetic Mean Roughness (Ra)

Arithmetic mean roughness (Ra) was determined by a method according to JIS B 0601 (1994) using a surface roughness measuring instrument (model: SE-3400, manufactured by Kosaka Laboratory Ltd.). In addition, a cut-off value and a measuring length are according to a standard value table shown in Table 3.

TABLE 3

| Range of Rz (μm) | | Cut-off value | Evaluation |
|---|---|---|---|
| Exceeding | Max. | λc (mm) | length ln (mm) |
| (0.006) | 0.02 | 0.08 | 0.4 |
| 0.02 | 0.1 | 0.25 | 1.25 |
| 0.1 | 2 | 0.8 | 4 |
| 2 | 10 | 2.5 | 12.5 |
| 10 | 80 | 8 | 40 |

Gloss Blackness Test

A cross-Nicol polarizer was bonded to the side opposite to a film face of the optical layered bodies of Examples and Comparative Examples, and then a sensory test (visually observed at about 45° angle to the sample at a position about 50 cm above the sample) was carried out using a three-wavelength fluorescent lamp (irradiated at a 45° angle to the sample) of 30 W to evaluate the gloss blackness in detail according to the following criteria.

Evaluation Criteria

Evaluation good: Gloss black color can be reproduced.

Evaluation poor: Gloss black color cannot be reproduced.

Sensory Test Method of Antiglare Property

Figure 2:
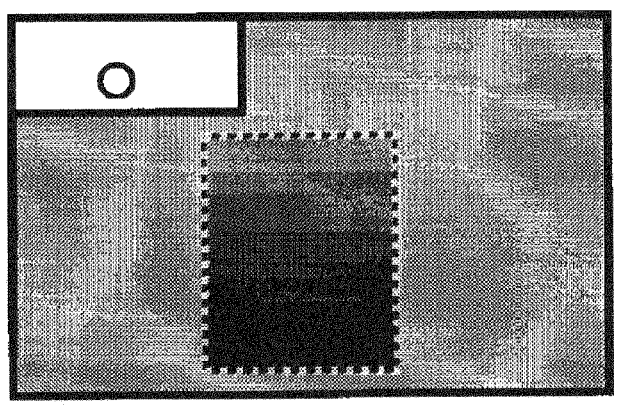
FIG. 2 is a schematic view showing a measuring method of an antiglare property.
Figure 2:
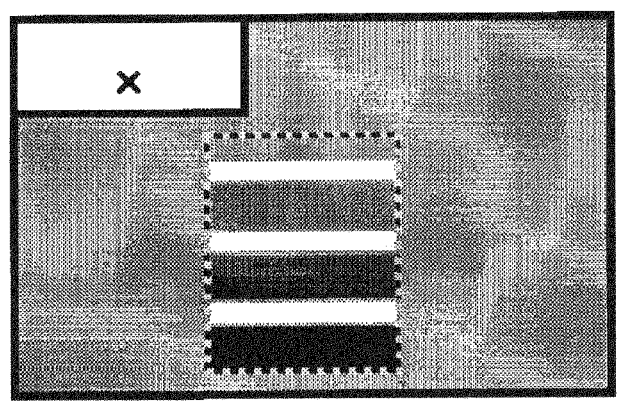
Figure 3A:
FIG. 3a is a schematic diagram of a cross section of the surface of a conventional antiglare layer.
Figure 3B:
FIG. 3b is a schematic diagram of a cross section of the surface of an antiglare layer of the present invention.
Figure 4A:
FIG. 4a is an optical microscope photograph of the surface of a conventional antiglare layer.
Figure 4B:
FIG. 4b is an optical microscope photograph of the surface of an antiglare layer of the present invention.
Figure 5:
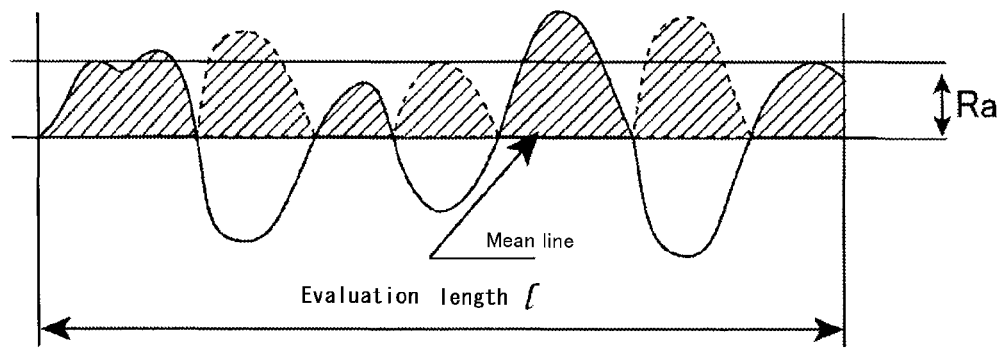
FIG. 5 is a schematic view for illustrating a calculation method of Ra.
Figure 6:
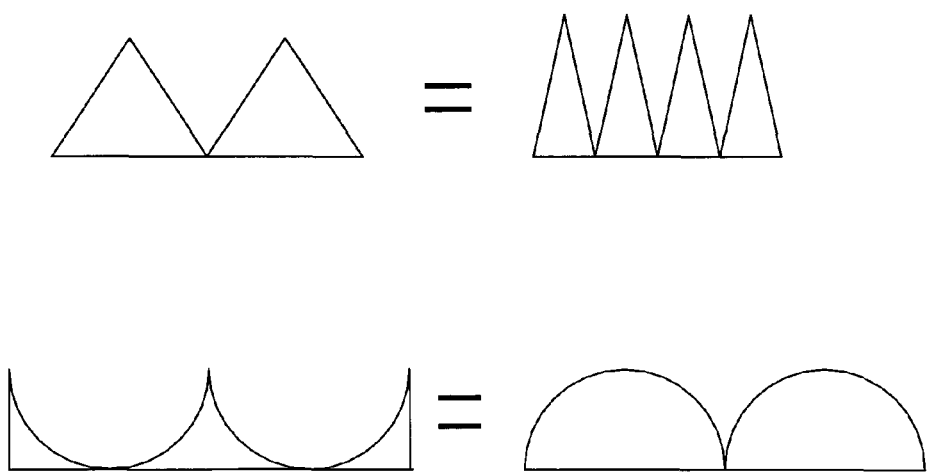
FIG. 6 is a schematic view of surface roughness of an antiglare layer.

A backside of a surface treated film was subjected to a tackiness treatment and this film was stuck on a black acrylic plate to form a sample for evaluation. A black-white 20 mm-wide stripe plate was prepared. The reflection of the stripe located at 20° from a normal line of the sample in the above sample was observed. Illumination of a sample face was set at 250 lux and brightness (white) of the stripe was set at 65 cd/cm². Further, a distance between the stripe plate and the sample was 1.5 m and a distance between the sample and an observer was 1 m. How the reflection of the sample is seen in the film by the observer was rated according to the following criteria. (refer to FIG. 2)

Good: Stripe cannot be recognized.

Poor: Stripe can be recognized.

TABLE 4

| | Evaluation 1 | | | | | | | | Evaluation 2 | Evaluation 3 |
|---|---|---|---|---|---|---|---|---|---|---|
| | Total haze(%) | Internal haze(%) | Surface haze(%) | Mean spacing of tops of local peak of profile S (mm) | Surface roughness | | | | Gloss blackness | Antiglare property |
| | | | | | Sm | θa | Rz | Ra | | |
| Example 1 | 1.0 | 0 | 1 | 0.0676 | 89.0 | 0.429 | 0.3721 | 0.0868 | Good | Good |
| Example 2 | 5.0 | 1 | 4 | 0.0869 | 81.1 | 0.59 | 0.322 | 0.128 | Good | Good |
| Example 3 | 29.6 | 28.0 | 1.6 | 0.0519 | 52.5 | 0.89 | 0.412 | 0.135 | Good | Good |
| Example 4 | 1.1 | 0 | 1.1 | 0.0793 | 99.0 | 0.414 | 0.312 | 0.0927 | Good | Good |
| Example 5 | 17.1 | 15.7 | 1.4 | 0.0552 | 65 | 0.49 | 0.56 | 0.0906 | Good | Good |
| Example 6 | 30.0 | 26 | 4.0 | 0.0462 | 98.3 | 0.998 | 1 | 0.202 | Good | Good |
| Comparative example 1 | 15.1 | 9.7 | 5.4 | 0.0346 | 87.1 | 0.905 | 0.965 | 0.131 | Poor | Good |
| Comparative example 2 | 37.8 | 26.5 | 11.3 | 0.0388 | 40.7 | 9.097 | 4.317 | 0.984 | Poor | Good |
| Comparative example 3 | 28.0 | 15 | 13 | 0.0420 | 70.54 | 1.2 | 1.512 | 0.249 | Poor | Good |
| Comparative example 4 | 15.4 | 14.2 | 1.2 | 0.1291 | 332.7 | 1.037 | 1.131 | 0.14 | Good | Poor |

It was shown from the results shown in Table 4 that the optical layered body of the present invention has an excellent antiglare property and excellent gloss blackness simultaneously. Further, even though the optical layered bodies have Ra which are close to one another, there is a difference between optical layered bodies (for example, Example 3) in which both the gloss blackness and the antiglare property are good and optical layered bodies (for example, Comparative Examples 1 and 4) in which only either of the gloss blackness and the antiglare property is good, and therefore it was suggested that effects of the present invention can be achieved by specifying the surface roughness by Sm, θa, and Rz rather than Ra.

INDUSTRIAL APPLICABILITY

The optical layered body of the present invention can be used as an antireflection films of cathode ray tube (CRT) display devices, liquid crystal displays (LCD), plasma displays (PDP), electroluminescence displays (ELD) and the like and a production apparatus of these antireflection films.

The invention claimed is:

1. An optical layered body comprising a light-transmitting substrate and an antiglare layer provided on the light-transmitting substrate,
    wherein the antiglare layer has a surface roughness on the outermost surface and a surface haze of 1 to 4%, and
    wherein in the optical layered body, a mean spacing of tops of local peak of profile S is 0.045 mm or more and 0.10 mm or less determined by the following procedure: a roughness curve of the surface roughness is measured, a mean line of the roughness curve is drawn, and a reference length is set in a direction of the mean line,
    total number (m) of tops of local peak of profile of the roughness curve within the reference length is counted,
    Si representing a value of a length between a (m)th top of local peak of profile and a (m−1)th top of local peak of profile, and n representing number of Si are introduced into the following formula (I):

[Formula 1]

$$S' = \frac{1}{n}\sum_{i=1}^{n} S_i \quad (I)$$

to determine S', and
a value of S' in the following same reference length is calculated and the calculation is repeated N times, and S'j representing a value of S' calculated in the above formula (I) and N representing number of S'j are introduced into the following formula (II):

[Formula II]

$$S = \frac{1}{N}\sum_{j=1}^{N} S'_j \quad (II)$$

to determine a mean spacing of tops of local peak of profile S, and
wherein when denoting a mean spacing of profile irregularities of the surface of the optical layered body by Sm, a mean inclination angle of profile irregularities by θa, and mean roughness of the surface roughness by Rz,
Sm is 50 μm or more and less than 100 μm,
θa is 0.1° or more and 1.0° or less, and
Rz is more than 0.2 μm and 1.0 μm or less.

2. The optical layered body according to claim 1, wherein the antiglare layer comprises a single layer of a rough surface layer.

3. The optical layered body according to claim 2, which comprises an under coat rough surface layer and a surface adjustment layer formed on the under coat rough surface layer and wherein the antiglare layer further comprises a low refractive index layer, and wherein the low refractive index layer has a lower refractive index than that of the under coat rough surface layer or the surface adjustment layer.

4. The optical layered body according to claim 2 which is an antireflection layered body.

5. A method for producing the optical layered body according to claim 2, comprising the step of applying a composition for the antiglare layer onto the light-transmitting substrate to form the antiglare layer.

6. A polarizer comprising a polarizing element, wherein the optical layered body according to claim 2 is provided on a surface of the polarizing element opposed to a face where the antiglare layer of the optical layered body is present.

7. The optical layered body according to claim 1, wherein the antiglare layer comprises an under coat rough surface layer and a surface adjustment layer formed on the under coat rough surface layer.

8. The optical layered body according to claim 7, wherein the antiglare layer further comprises a low refractive index layer, and wherein the low refractive index layer has a lower refractive index than that of the under coat rough surface layer or the surface adjustment layer.

9. The optical layered body according to claim 7 which is an antireflection layered body.

10. The optical layered body according to claim 9, wherein the antiglare layer further comprises a low refractive index layer, and wherein the low refractive index layer has a lower refractive index than that of the under coat rough surface layer or the surface adjustment layer.

11. The optical layered body according to claim 10 which is an antireflection layered body.

12. A method for producing the optical layered body according to claim 10, comprising the step of applying a composition for the antiglare layer onto the light-transmitting substrate to form the antiglare layer.

13. A method for producing the optical layered body according to claim 7, comprising the step of applying a composition for the antiglare layer onto the light-transmitting substrate to form the antiglare layer.

14. A polarizer comprising a polarizing element, wherein the optical layered body according to claim 7 is provided on a surface of the polarizing element opposed to a face where the antiglare layer of the optical layered body is present.

15. The optical layered body according to claim 1 which is an antireflection layered body.

16. A method for producing the optical layered body according to claim 15, comprising the step of applying a composition for the antiglare layer onto the light-transmitting substrate to form the antiglare layer.

17. A method for producing the optical layered body according to claim 1, comprising the step of applying a composition for the antiglare layer onto the light-transmitting substrate to form the antiglare layer.

18. A polarizer comprising a polarizing element, wherein the optical layered body according to claim 1 is provided on a surface of the polarizing element opposed to a face where the antiglare layer of the optical layered body is present.

19. An image display device, comprising a light-transmitting display and a light source apparatus to irradiate the light-transmitting display from a backside, wherein the image display device comprises the polarizer according to claim 18 at surfaces of the light-transmitting display.

20. An image display device, comprising a light-transmitting display and a light source apparatus to irradiate the light-transmitting display from a backside, wherein the image display device comprises the optical layered body according to claim 1.

* * * * *

UNITED STATES PATENT AND TRADEMARK OFFICE
CERTIFICATE OF CORRECTION

| | | |
|---|---|---|
| PATENT NO. | : 8,493,660 B2 | |
| APPLICATION NO. | : 12/377782 | |
| DATED | : July 23, 2013 | |
| INVENTOR(S) | : Gen Furui et al. | |

It is certified that error appears in the above-identified patent and that said Letters Patent is hereby corrected as shown below:

On the Title Page:

At (87), the PCT Pub. Date should be corrected to read -- Feb. 21, 2008 --

Signed and Sealed this
Eighth Day of October, 2013

Teresa Stanek Rea
*Deputy Director of the United States Patent and Trademark Office*